United States Patent [19]

Ashiba et al.

[11] Patent Number: 5,368,142

[45] Date of Patent: Nov. 29, 1994

[54] DAMPING FORCE CONTROL TYPE OF HYDRAULIC SHOCK ABSORBER

[75] Inventors: Masahiro Ashiba; Takao Nakadate, both of Kanagawa, Japan

[73] Assignee: Tokico Ltd., Kanagawa, Japan

[21] Appl. No.: 986,036

[22] Filed: Dec. 4, 1992

[30] Foreign Application Priority Data

| Dec. 7, 1991 [JP] | Japan | 3-349668 |
| Dec. 27, 1991 [JP] | Japan | 3-359085 |
| Jan. 31, 1992 [JP] | Japan | 4-042209 |
| Aug. 20, 1992 [JP] | Japan | 4-245861 |

[51] Int. Cl.$^5$ .............................. F16F 9/44
[52] U.S. Cl. ..................... 188/319; 188/299; 188/322.15; 188/282; 188/322.22
[58] Field of Search ............ 188/319, 322.15, 322.22, 188/299, 281, 282, 322.13, 280, 317, 318, 316, 320, 288, 286, 285

[56] References Cited

U.S. PATENT DOCUMENTS

| 4,800,994 | 1/1989 | Imaizumi et al. | 188/322.15 X |
| 4,826,207 | 5/1989 | Yoshioka et al. | 188/319 X |
| 4,997,068 | 3/1991 | Ashiba | 188/282 X |
| 5,018,608 | 5/1991 | Imaizumi | 188/282 X |
| 5,129,488 | 7/1992 | Furuya et al. | 188/282 |
| 5,178,242 | 1/1993 | Nakamura et al. | 188/319 |
| 5,226,512 | 7/1993 | Kanari | 188/319 |
| 5,242,038 | 9/1993 | Yamaoka | 188/322.15 |
| 5,248,014 | 9/1993 | Ashiba | 188/282 |

FOREIGN PATENT DOCUMENTS

| 3606306 | 9/1987 | Germany . |
| 4029554 | 6/1991 | Germany . |
| 58-70533 | 5/1983 | Japan . |
| 61-75007 | 4/1986 | Japan . |
| 61-75008 | 4/1986 | Japan . |
| 0113139 | 5/1991 | Japan | 188/319 |
| 2223291 | 4/1990 | United Kingdom | 188/319 |
| 2236574 | 4/1991 | United Kingdom | 188/319 |
| 2238843 | 6/1991 | United Kingdom . |

*Primary Examiner*—Douglas C. Butler
*Attorney, Agent, or Firm*—Wenderoth, Lind & Ponack

[57] ABSTRACT

A damping force control type of hydraulic shock absorber includes a cylinder in which a piston is fitted to define two chambers. A main hydraulic fluid passage extends between the chambers, and a damping force generating mechanism is provided in the passage. A bypass passage is also provided between the two chambers. Two check valves are provided in the bypass passage and allow hydraulic fluid to flow in opposite directions, respectively, through the bypass passage. A first hydraulic fluid passage bypasses the first check valve and a second hydraulic fluid passage bypasses the second check valve. A control valve is provided to vary the sectional area of each of the first and second hydraulic fluid passages.

4 Claims, 18 Drawing Sheets

Fig. 6A
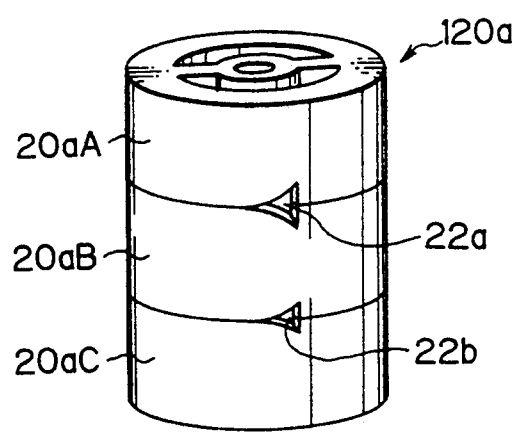
Fig. 6B
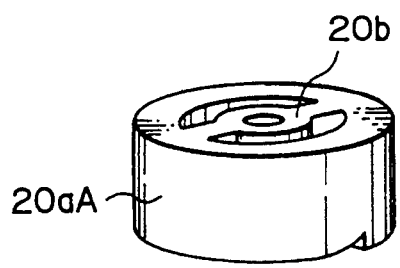
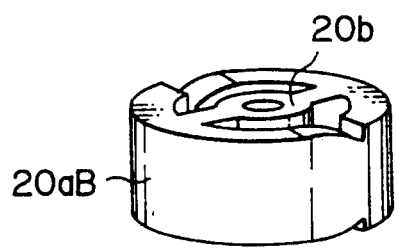
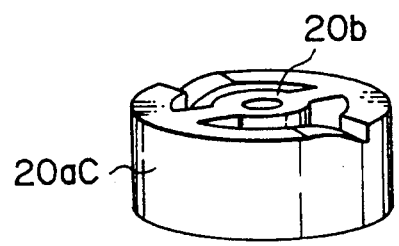

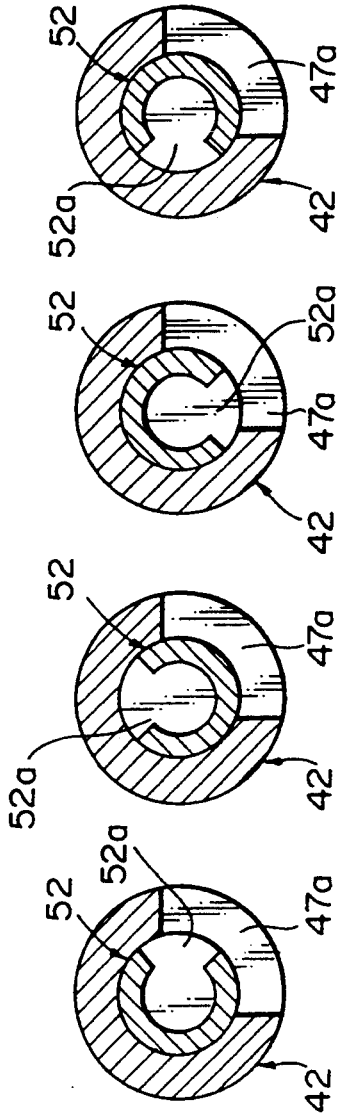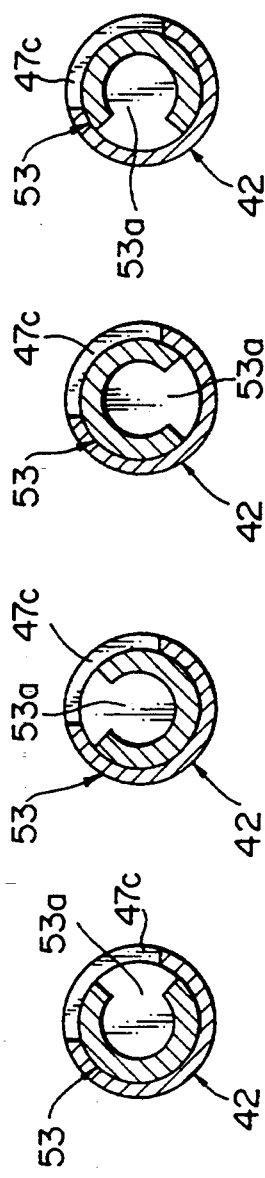

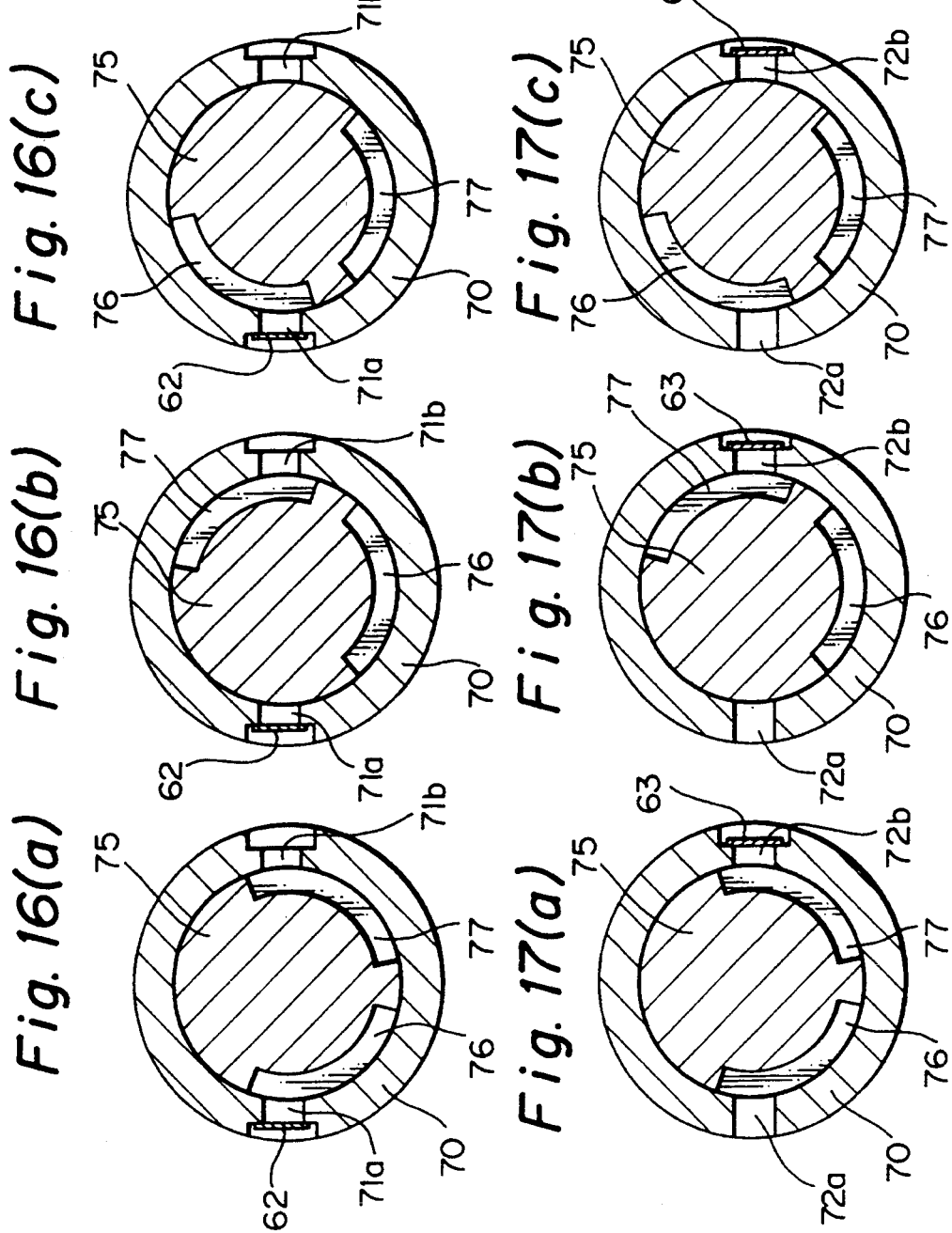

DAMPING FORCE CONTROL TYPE OF HYDRAULIC SHOCK ABSORBER

BACKGROUND OF THE INVENTION

1. Field of the Invention

The present invention relates to a damping force control type of hydraulic shock absorber for use in a suspension system of a vehicle, for example, an automobile.

2. Description of the Prior Art

Hydraulic shock absorbers for use in a suspension system of an automobile or other vehicle include damping force control type of hydraulic shock absorbers which are designed so that the level of a damping force can be controlled properly in accordance with the road surface conditions, vehicle running conditions, etc., thereby improving the ride quality and the steering stability.

Japanese Utility Model Application Public Disclosure (KOKAI) No. 58-70533 (1983) discloses one example of a conventional hydraulic shock absorber of the type described above. The disclosed hydraulic shock absorber includes a cylinder having a hydraulic fluid sealed therein, and a piston with a piston rod connected thereto, which is slidably fitted in the cylinder to define two chambers in the cylinder. The two chambers communicate with each other through first and second hydraulic fluid passages. The first hydraulic fluid passage is provided with a first damping Force generating mechanism (including an orifice, a disk valve, etc.) that generates a relatively large damping Force, while the second hydraulic fluid passage is provided with a second damping force generating mechanism that generates a relatively small damping force, together with a damping force control valve that opens and closes the second hydraulic fluid passage.

With the above arrangement, when the damping force control valve is open, the hydraulic fluid in the cylinder flows mainly through the second hydraulic fluid passage in response to the sliding movement of the piston caused by the extension and retraction of the piston rod, thereby generating a relatively small damping force during both the extension and retraction strokes. Thus, "soft" damping force characteristics are obtained. When the damping force control valve is closed, the hydraulic fluid in the cylinder flows through only the first hydraulic fluid passage in response to the sliding movement of the piston caused by the extension and retraction of the piston rod, thereby generating a relatively large damping force during both the extension and retraction strokes. Thus, "hard" damping force characteristics are obtained. In this way, the damping force characteristics can be switched by opening and closing the damping force control valve.

In the meantime, a suspension control system has been known wherein the damping force characteristics of the above-described damping force control type of hydraulic shock absorber are automatically switched in accordance with the road surface conditions, vehicle running conditions, etc. by using a controller and an actuator, thereby improving the ride quality and the steering stability.

In the suspension control system of the type described above, when the piston rod moves toward a predetermined neutral position, the damping force characteristics of the hydraulic shock absorber are made "hard", whereas, when the piston rod moves away from the neutral position, the damping force characteristics are made "soft", whereby it is possible to control the bouncing of the vehicle body effectively and hence Improve the ride quality.

However, when such bouncing control is effected by using the above-described conventional damping force control type of hydraulic shock absorber, some problems arise. That is, when different damping force characteristics are needed for the extension and retraction strokes of the piston rod, e.g., "hard" damping force characteristics during the extension stroke, and "soft" damping force characteristics during the retraction stroke, the damping force control valve must be opened and closed each time the extension and retraction strokes change from one to the other. However, it takes about 15 msec to 20 msec in general from the time when the controller outputs a switching signal upon detecting a change in the stroke direction of the piston rod until the damping force control valve is opened or closed by the actuator that is activated In response to the switching signal. Therefore, it is difficult to effect an adequate control during the actual running of the vehicle.

SUMMARY OF THE INVENTION

In view of the above-described problems of the prior art, it is an object of the present invention to provide a damping force control type of hydraulic shock absorber which enables different damping force characteristics during the extension and retraction strokes to be quickly established in response to a change in the direction of movement of the piston rod.

To this end, according to a first of the present invention, there is provided a damping force control type of hydraulic shock absorber which includes a cylinder having a hydraulic fluid sealed therein, a piston that is slidably fitted in the cylinder to define two chambers in the cylinder, and a piston rod that is connected at one end thereof to the piston and extends at the other end thereof outside of the cylinder. The hydraulic shock absorber further includes a main hydraulic fluid passage that places the two chambers in communication with each other and a damping force generating mechanism in the main passage, and a bypass passage that bypasses the damping force generating mechanism and also places the two chambers in communication with each other. In addition, a pair of first and second check valves are provided in series in the bypass passage to allow hydraulic fluid to flow in respective directions which are opposite to each other. The hydraulic shock absorber further includes a first hydraulic fluid passage that bypasses the first check valve, and a second hydraulic fluid passage that bypasses the second check valve. In addition, the hydraulic shock absorber includes a first damping force control valve that varies the sectional area of the first hydraulic fluid passage, and a second damping force control valve that varies the sectional area of the second hydraulic fluid passage.

The present invention also provides a damping force control type a hydraulic shock absorber which includes a cylinder having a hydraulic fluid sealed therein a hydraulic fluid chamber defining member that is slidably fitted in the cylinder to define two chambers in the cylinder, and a rod that is connected at one end thereof to the hydraulic fluid chamber defining member and extends at the other end thereof to the outside of the cylinder. The hydraulic shock absorber further includes a main hydraulic fluid passage that places the two chambers in communication with each other, a first damping force generating mechanism that is provided in the main hydraulic fluid passage to generate a damping force, and a second damping force generating mechanism that is provided in the main hydraulic fluid passage in series to the first damping force generating mechanism to generate a damping force. Further, the hydraulic shock absorber includes a first bypass passage that bypasses the first damping force generating mechanism, and a second bypass passage that bypasses the second damp ink force generating mechanism. In addition, a pair of first and second check valves are provided in the first and second bypass passages, respectively, to allow hydraulic fluid to flow in respective directions which are different from each other. The hydraulic shock absorber further includes a first damping force control valve that varies the passage area of the first bypass passage, and a second damping force control valve that varies the sectional area of the second bypass passage.

The present invention also provides a damping force control type of hydraulic shock absorber which includes a cylinder having a hydraulic fluid sealed therein, a piston slidably fitted in the cylinder to define two chambers in the cylinder, and a piston rod connected at one end thereof to the piston and extending at the other end thereof to the outside of the cylinder. The hydraulic shock absorber further includes a main hydraulic fluid passage placing the two chambers in communication, a damping force generating mechanism in the main passage, and a bypass passage bypassing the damping force generating mechanism and also placing the two chambers in communication with each other. Furthermore, a cylindrical guide member is disposed in the bypass passage to prevent the hydraulic fluid from flowing in the area outside the guide member. The shock absorber further comprises a first by-pass passage including a pair of axially spaced bores in the side wall of the guide member and a space defined in the guide member, and a second bypass passage including a pair of axially spaced bores in the side wall of the guide member circumferentially spaced from the bores of the first bypass passage and a space defined in the guide member as separated from the space forming the first bypass passage. First and second check valves are provided in the first and second bypass passages, respectively, to allow hydraulic fluid to flow in respective directions which are opposite to each other. A shutter is movably mounted in the guide member to vary the sectional area of said bypass passages.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which:

FIG. 6A and 6B are detailed illustrations of the shutter shown in FIG. 5;

FIGS. 11(a), 11(b), 11(c), 11(d), 12(a), 12(b), 12(c) and 12(d) show the positions of a shutter which is employed in the hydraulic shock absorber, shown in FIG. 10, FIGS. 11(a), 11(b), 11(c), 11(d), and FIGS. 12(a), 12(b), 12(c) and 12(d) being sectional views taken along lines 11—11 and 12—12 in FIG. 10, respectively;

FIGS. 16(a), 16(b), 16(c), 17(a), 17(b) and 17(c) show the position of a shutter which is employed in the hydraulic shock absorber, shown in FIG. 15, FIGS. 16(a), 16(b), 16(c) and 17(a), 17(b) and 17(c) being sectional views taken along lines 16—16 and 17—17 in FIG. 15, respectively;

DETAILED DESCRIPTION OF THE PREFERRED EMBODIMENTS

Embodiments of the present invention will be described below in detail with reference to the accompanying drawings. First of all, a first embodiment of the present invention will be described with reference to FIGS. 1 to 4.

Figure 1:
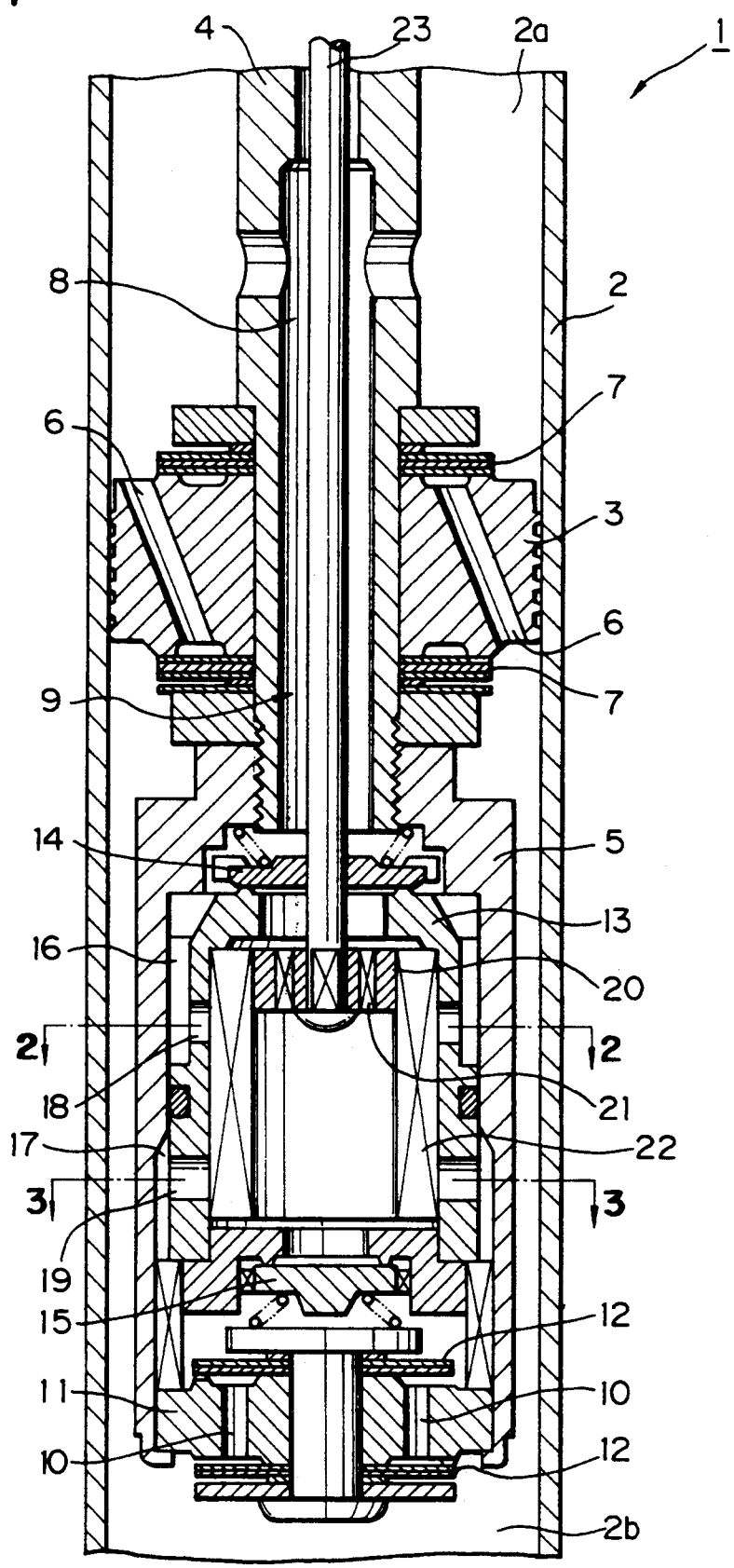
FIG. 1 is a vertical sectional view of an essential part a first embodiment of the damping force control type of hydraulic shock absorber according to the present invention.

Referring to FIG. 1, a damping force control type of hydraulic shock absorber 1 of the present invention includes a cylinder 2 having a hydraulic fluid sealed therein, and a piston 3 which is slidably fitted in the cylinder 2 to divide the inside of the cylinder 2 into two chambers, i.e., a cylinder upper chamber 2a and a cylinder lower chamber 2b. The proximal end portion of a piston rod 4 extends through the piston 3, and the distal end portion extends as far as the outside of the cylinder 2. The piston rod 4 has a cylindrical passage member 5 screwed onto the proximal end portion thereof, thereby being connected to the piston 3. The cylinder 2 is provided with a reservoir chamber (not shown) for compensating for a change in the amount of hydraulic fluid in the cylinder 2 that corresponds to the amount by which the piston rod 4 enters or withdraws from the cylinder 2.

The piston 3 is provided with main hydraulic fluid passages 6 which place the cylinder upper and lower chambers 2a and 2b in communication with each other. Each end face of the piston 3 is provided with a first damping force generating mechanism 7 (which generates a relatively large damping force) comprising an orifice and a disk valve, which control the flow of the hydraulic fluid in the main hydraulic fluid passage 6 so as to generate a damping force.

The piston rod 4 is provided with a hydraulic fluid passage 8 that opens at one end thereof into the cylinder upper chamber 2a and at the other end thereof into the passage member 5 at the cylinder lower chamber side. The hydraulic fluid passage 8 and the passage member 5 constitute a bypass passage 9 that places the cylinder upper and lower chambers 2a and 2b in communication with each other.

The opening end portion of the passage member 5, which opens to the cylinder lower chamber 2b, is fitted with a valve member 11 having hydraulic fluid passages 10 which communicate with the bypass passage 9. Each end face of the valve member 11 is provided with a second damping force generating mechanism 12 (which generates a relatively small damping force) comprising an orifice and a disk valve, which control the flow of the hydraulic fluid in the hydraulic fluid passage 10 so as to generate a damping force.

The passage member 5 has a cylindrical guide member 13 fitted therein. The end of the guide member 13, which is closer to the cylinder upper chamber 2a, is provided with a check valve 14, serving as a first check valve, which allows hydraulic fluid to flow from the guide member 13 toward the cylinder upper chamber 2a but prevents hydraulic fluid from flowing in the reverse direction. The end of the guide member 13, which is closer to the cylinder lower chamber 2b, is provided with a check valve 15, serving as a second check valve, which allows hydraulic fluid to flow from the guide member 13 toward the cylinder lower chamber 2b but prevents the hydraulic fluid from flowing in the reverse direction.

Between the passage member 5 and the guide member 13 are formed a hydraulic fluid passage 16 which communicates with that portion of the bypass passage 9 which is closer to the cylinder upper chamber 2a, and a hydraulic fluid passage 17 which communicates with that portion of the bypass passage 9 which is closer to the cylinder lower chamber 2b. The side wall of the guide member 13 is provided with a pair of bores 18 which communicate with the hydraulic fluid passage 16, and a pair of bores 19 which communicate with the hydraulic fluid passage 17. The hydraulic fluid passage 16 and the bores 18 constitute a first hydraulic fluid passage which bypasses the check valve 14, while the hydraulic fluid passage 17 and the bores 19 constitute a second hydraulic fluid passage which bypasses the check valve 15.

The guide member 13 receives a shutter 20 in the shape of a cylinder having one closed end. The shutter is rotatably fitted in the member 13 and serves as first and second damping force control valves. The end of the shutter 20 is provided with a hydraulic fluid passage 21 which places the inside of the shutter 20 in communication with the side thereof which is closer to the check valve 14. The side wall of the shutter 20 is formed with a pair of slits 22, which can be aligned with the bores 18 and 19 of the guide member 13 by rotating the shutter 20. Thus, it is possible to change the areas of passages to which the first and second hydraulic fluid passages open and to selectively open and close the hydraulic fluid passages 16, 17 by bringing the slits 22 into and out of alignment with the bores 18 and 19.

Figure 2A:
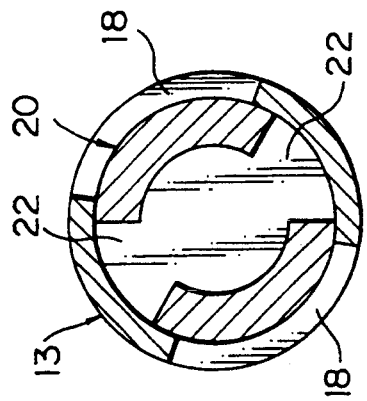
FIGS. 2(a), 2(b), 2(c), 3(a), 3(b) and 3(c) show the positions of a shutter which is employed in the hydraulic shock absorber of the present invention, FIGS. 2(a), 2(b), 2(c) and FIGS. 3(a), 3(b), 3(c) being sectional views taken along lines 2—2 and 3—3 in FIG. 1, respectively.
Figure 2B:
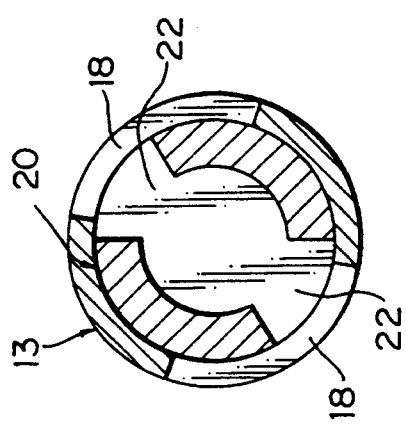
Figure 2C:
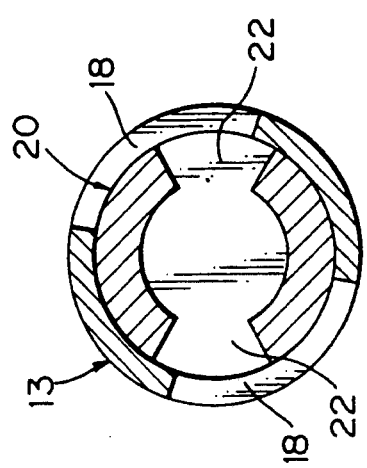
Figure 3A:
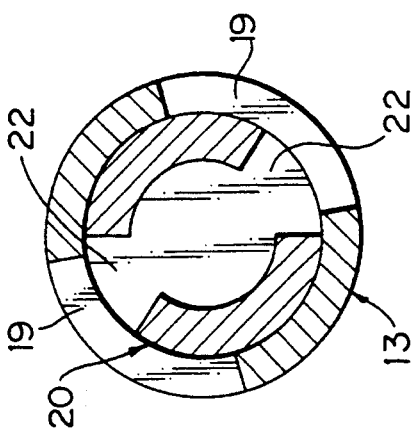
Figure 3B:
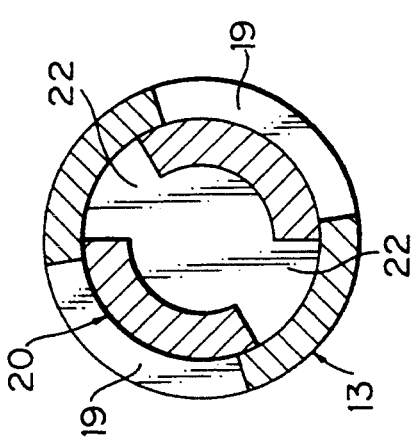
Figure 3C:
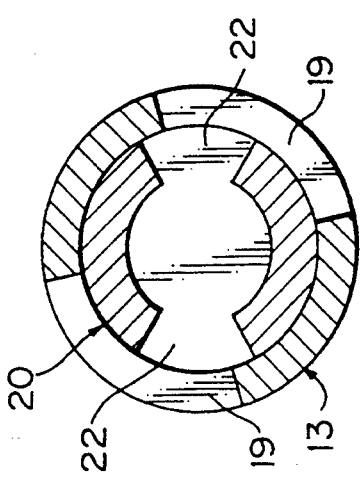
Figure 4:
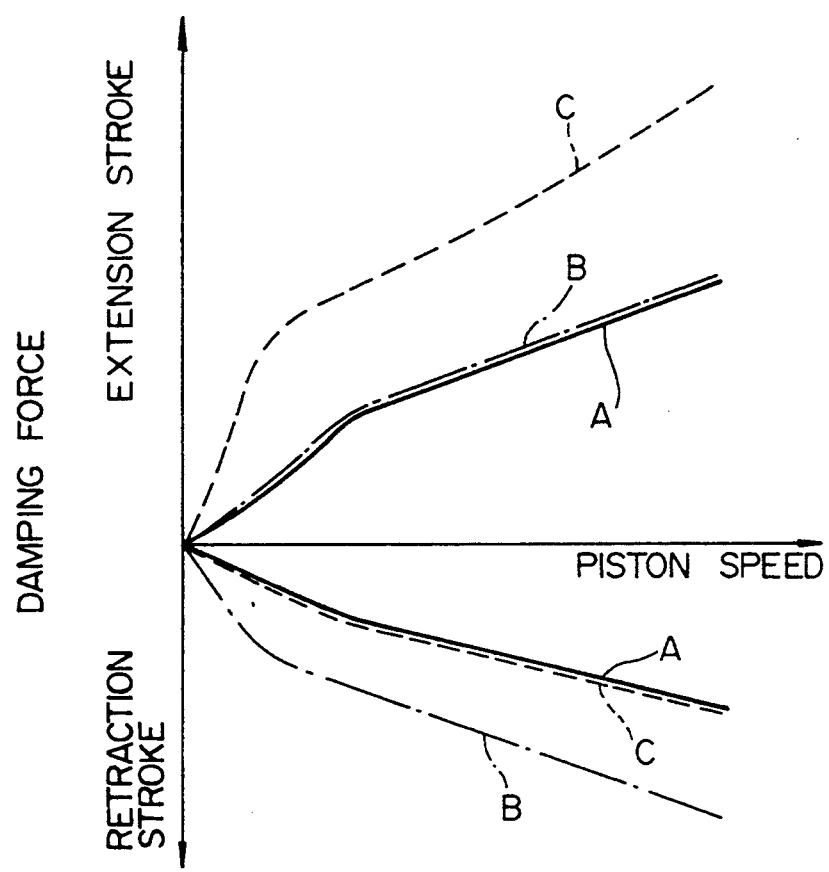
FIG. 4 is a graph of damping force characteristics of the hydraulic shock absorber, shown in FIG. 1.

As shown in FIGS. 2 and 3, the bores 18 and 19 of the guide member 13 are provided at respective positions which are symmetrical with respect to the center of the guide member 13. Thus, when the shutter 20 is in position A shown in FIGS. 2(A) and 3(A), the slits 22 align with the bores 18 and 19; when the shutter 20 is in position B shown in FIGS. 2(B) and 3(B), the slits 22 align with only the bores 18; and when the shutter 20 is in position C shown in FIGS. 2(C) and 3(C), the slits 22 align with only the bores 19. The shutter 20 has a control rod 23 connected to the end thereof. The control rod 23 extends through the check valve 14 and along the piston rod 4 as far as the outside thereof so that the shutter 20 can be rotated from the outside of the damping force control type of hydraulic shock absorber 1.

The operation of the first embodiment will be explained below. In operation, the shutter 20 is rotated by actuating the control rod 23 from the outside of the damping force control type of hydraulic shock absorber 1, thereby enabling the combinations of damping force characteristics to be switched over from one to another.

Referring to FIGS. 2 and 3, when the shutter 20 is in the position shown in FIGS. 2(A) and 3(A), the bores 18 and the slits 22 align with each other, so that hydraulic fluid can bypass the check valve 14 via the hydraulic fluid passage 16 and the bores 18. Also, the bores 19 and the slits 22 align with each other so that hydraulic fluid can bypass the check valve 15 via the hydraulic fluid passage 17 and the bores 19. As a result, the passages that constitute the bypass passage 9 communicate with each other at all times during the extending and retracting movement of the piston rod 4. Accordingly, during both the extension and retraction strokes, the hydraulic fluid in the cylinder 2 flows through both the main hydraulic fluid passage 6 and the bypass passage 9 in response to the sliding movement of the piston 3, so that a relatively small damping force is generated by the action of the first and second damping force generating mechanisms 7 and 12. Thus, "soft" damping force characteristics are obtained during both the extension and retraction strokes, as shown by the curves A in FIG. 4.

When the shutter 20 is in the position shown in FIGS. 2(B) and 3(B), the bores 18 and the slits 22 align with each other, so that hydraulic fluid bypasses the check valve 14 via the hydraulic fluid passage 16 and the bores 18. On the other hand, the bores 19 are closed by the shutter 20. Therefore, the passages constituting the bypass passage 9 communicate with each other through the check valve 15. As a result, hydraulic fluid is allowed to flow from the cylinder upper chamber 2a toward the cylinder lower chamber 2b but the hydraulic fluid is prevented from flowing in the reverse direction is prevented. Accordingly, during the extension stroke of the piston rod 4, the hydraulic fluid in the cylinder 2 flows through both the main hydraulic fluid passage 6 and the bypass passage 9 in response to the sliding movement of the piston 3. Thus, a relatively small damping force is generated by the action of the first and second damping force generating mechanisms 7 and 12. On the other hand, during the retraction stroke, the hydraulic fluid is prevented from flowing through the bypass passage 9. Therefore, the hydraulic fluid in the cylinder 2 flows through only the main hydraulic fluid passage 6 in response to the sliding movement of the piston 3, so that a relatively large damping force is generated by the action of the first damping force generating mechanism 7. Thus, "soft" damping force characteristics are obtained during the extension stroke, while "hard" damping force characteristics are obtained during the retraction stroke, as shown by the curves B in FIG. 4.

When the shutter 20 is in the position shown in FIGS. 2(C) and 3(C), the bores 18 are closed by the shutter 20. On the other hand, the bores 19 and the slits 22 align with each other, so that hydraulic fluid bypasses the check valve 15 via the hydraulic fluid passage 17 and the bores 19. Therefore, the passages constituting the bypass passage 9 communicate with each other through the check valve 14. As a result, hydraulic fluid is allowed to flow from the cylinder lower chamber 2b toward the cylinder upper chamber 2a, while the hydraulic fluid is prevented from flowing in the reverse direction. Accordingly, during the retraction stroke of the piston rod 4, the hydraulic fluid in the cylinder 2 flows through the main hydraulic fluid passage 6 and the bypass passage 9 in the response to the sliding movement of the piston 3, so that a relatively small damping force is generated by the action of the first and second damping force generating mechanisms 7 and 12. On the other hand, during the extension stroke, hydraulic fluid is prevented from flowing through the bypass passage 9. Therefore, the hydraulic fluid in the cylinder 2 flows through only the main hydraulic fluid passage 6 in response to the sliding movement of the piston 3, so that a relatively large damping force is generated by the action of the first damping force generating mechanism 7. Thus, "hard" damping force characteristics are obtained during the extension stroke, while "soft" damping force characteristics are obtained during the retraction stroke, as shown by the curves C in FIG. 4.

In this way, by rotating the shutter 20 so as to change the position thereof, the damping force characteristics of the damping force control type hydraulic shock absorber 1 can be selected from among the following three different combinations:

| Position A: | the extension stroke | "soft" |
| --- | --- | --- |
| | the retraction stroke | "soft" |
| Position B: | the extension stroke | "soft" |
| | the retraction stroke | "hard" |
| Position C: | the extension stroke | "hard" |
| | the retraction stroke | "soft" |

The shock absorber may also be configured to provide "hard" damping force characteristics during both the extension and retraction strokes by closing the bores 18 and 19 with the shutter 20 to thereby close the bypass passage 9.

Although in the above-described first embodiment that hydraulic shock absorber 1 is provided with the second damping force generating mechanisms 12, which comprise orifices and disk valves, it should be noted that the present invention is not necessarily so limited and the second damping force generating mechanisms 12 can be omitted if the bores 18 and 19 are configured to serve as flow restricting orifices instead. When a particularly low damping force (close to zero) is needed, the fluid resistance in the bypass passage may be used in place of the second damping force generating mechanism. In addition, the check valves 14 and 15 in the first embodiment are only required to act in respective direction which are different from each other. Therefore, the directions in the check valves 14 and 15 act to prevent the flow of fluid may be reversed.

Figure 19:
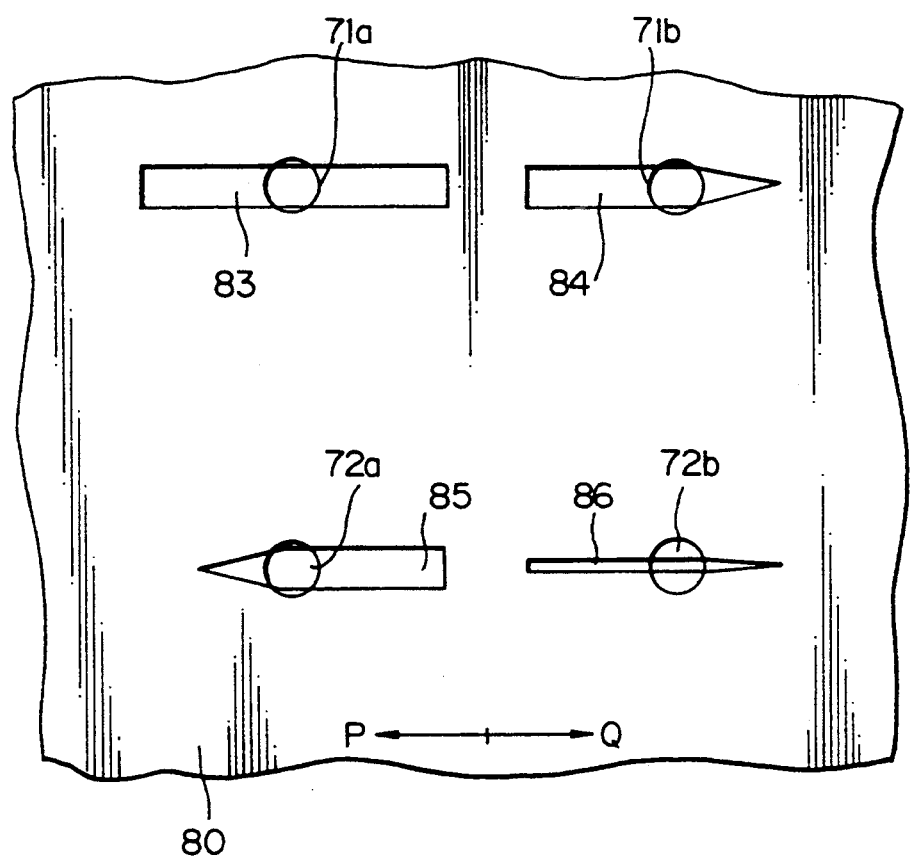
FIG. 19 is a developed view of a shutter which is employed in the hydraulic shock absorber, shown in FIG. 18, illustrating the positional relationship between bores in a guide member and slits in the shutter.

Although in the first embodiment the bores 18 and 19 are opened and closed with the shutter 20, the shutter 20 can be selectively set at any desired positions between the full-open and -closed positions so as to control the sectional areas of passages defined by the bores 18 and 19 and the slits 22 of the shutter 20, thereby generating desired damping forces. In this case, if the bores 18 and 19 are odd-shaped such as a bore 84 that is shown in FIG. 19 (described later), the sectional areas of the openings, defined by the bores 18 and 19 and the slits 22 of the shutter 20, can readily be varied continuously, so that the orifice characteristics can be changed continuously. Further, the slits 22 of the shutter 20 may have configurations other than that shown in the figure.

Next, a second embodiment of the damping force control type of hydraulic shock absorber, in which the damping force characteristics can be changed continuously, will be described. Since the second embodiment differs from the first embodiment only in the arrangement of the openings provided in the guide and the shutter, the same members as those in the first embodiment are denoted by the same reference numerals, and mostly only the portions in which the second embodiment differs from the first embodiment will be described in detail.

Figure 5:
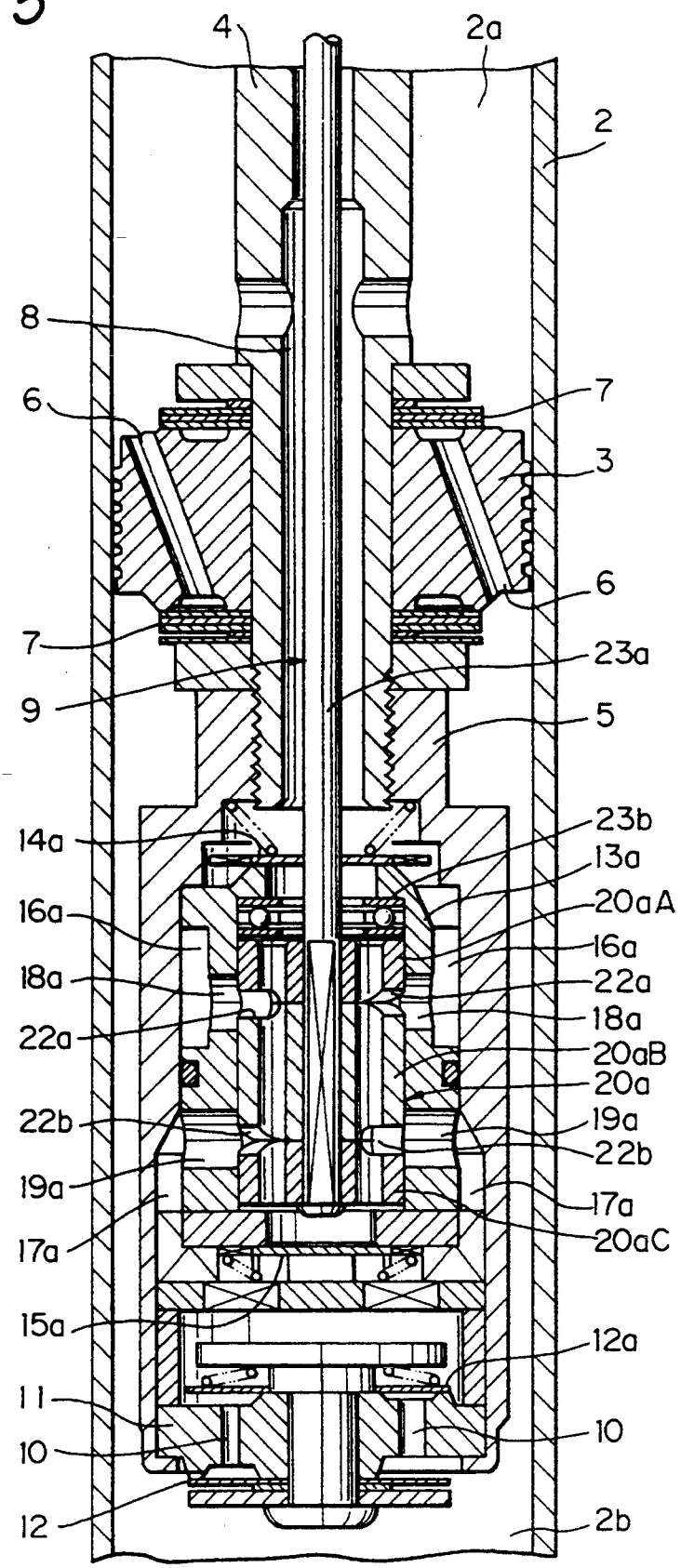
FIG. 5 is a vertical sectional view of an essential part of a second embodiment of the damping force control type of hydraulic shock absorber according to the present invention.

As shown in FIG. 5, the passage member 5 has a cylindrical guide member 13a fitted therein. One end of the guide member 13a is provided with a check valve 14a, serving as a first check valve, which allows hydraulic fluid to flow from the guide member 13a toward the cylinder upper chamber 2a but prevents hydraulic fluid from flowing in the reverse direction. The other end of the guide member 13a is provided with a check valve 15a, serving as a second check valve, which allows hydraulic fluid to flow from the guide member 13a toward the cylinder lower chamber 2b but prevents hydraulic fluid from flowing in the reverse direction.

Between the passage member 5 and the guide member 13a are formed a hydraulic fluid passage 16a which communicates with that portion of the bypass passage 9 which is closer to the cylinder upper chamber 2a, and a hydraulic fluid passage 17a which communicates with that portion of the bypass passage 9 which is closer to the cylinder lower chamber 2b. The side wall of the guide member 13a is provided with a pair of bores 18a which communicate with the hydraulic fluid passage 16a, and a pair of bores 19a which communicate with the hydraulic fluid passage 17a. The hydraulic fluid passage 16a and the bores 18a constitute a first hydraulic fluid passage which bypasses the check valve 14a, while The hydraulic fluid passage 17a and the bores 19a constitute a second hydraulic fluid passage which bypasses the check valve 15a.

The guide member 13a has a cylindrical shutter 20a rotatable fitted therein, which serves as first and second damping force control valves. The side wall of the shutter 20a is provided with a pair of openings 22a in opposing relation to the bores 18a of the guide member 13a, and a pair of openings 22b in opposing relation to the bores 19a. The openings 22a and 22b extend along the circumference of the shutter 20a. The openings 22a have a substantially wedge-like shape in which the widths thereof increase in one circumferential direction of the shutter, while the openings 22b also have a substantially wedge-like shape but in which the widths thereof increase in the other circumferential direction of the shutter. When the shutter 20a is rotated, the area of the communicating passage, which is defined between the bores 18a and the openings 22a, changes, so that the flow of hydraulic fluid through the first hydraulic fluid passage is controlled. Similarly, the area of the communicating passage, which is defined between the bores 19a and the openings 22b, changes, so that the flow of hydraulic fluid through the second hydraulic fluid passage is controlled. In this embodiment, when the bores 18a and the openings 22a are fully open to one another, the bores 19a and the openings 22b are fully closed. As the shutter 20a is rotated in one direction in this state, the area of the communicating passage, defined between the bores 18a and the openings 22a, decreases, while the area of the communicating passage, defined between the bores 19a and the openings 22b, increases. When the bores 18a and the openings 22a are fully closed, the bores 19a and the openings 22b are fully open to each other.

The shutter 20a has a control rod 23a connected thereto. The control rod 23a extends through the check valve 14a and along the piston rod 4 as far as the outside thereof so that the shutter 20a can be rotated from the outside of the damping force control type of hydraulic shock absorber. The shutter 20a comprises three members 20aA, 20aB and 20aC, which are connected in series by the control rod 23a. Reference numeral 23b in the figure denotes a bearing which supports the shutter 20a so that it can be rotated with a small torque. The bearing 23b has a hydraulic fluid passage formed in the inner peripheral portion thereof.

In this embodiment, a check valve 12a is provided in place of a portion of the second damping force generating mechanism 12 in the first embodiment so as to allow hydraulic fluid to flow through the hydraulic fluid passage 10 from the cylinder lower chamber toward the cylinder upper chamber.

The operation of the second embodiment will be described below. In operation, the shutter 20a is rotated by actuating the control rod 23a from the outside, thereby enabling the combinations of damping force characteristics to be switched overt from one to another.

Figure 7:
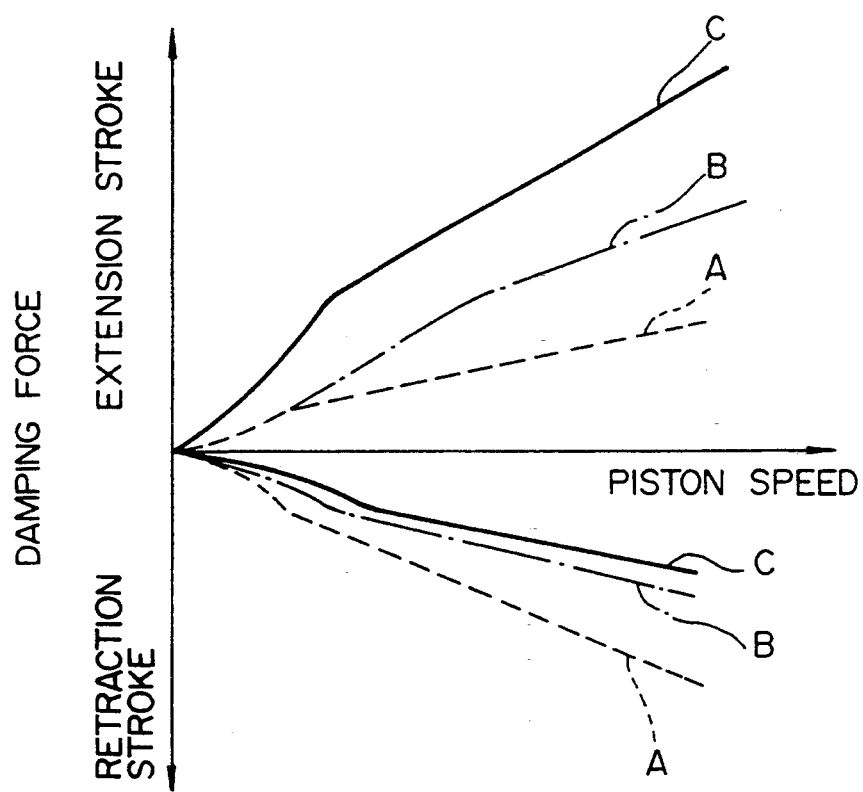
FIG. 7 is a graph of damping force characteristics of the hydraulic shock absorber, shown in FIG. 6.

When the shutter 20a is rotated so that the bores 18a and the openings 22a are fully open to each other, while the bores 19a and the openings 22b are fully closed, during the extension stroke of the piston rod 4, the hydraulic fluid flows from the cylinder upper chamber through the bypass passage 9 as follows. The hydraulic fluid first closes the check valve 14a, and passes through the hydraulic fluid passage 16a, the bores 18a and the openings 22a. Then, the hydraulic fluid opens the check valve 15a, and flows into the cylinder lower chamber 2b through the hydraulic fluid passage 10. Thus, a small damping force is generated by the bores 18a and the openings 22a, and the damping force generating mechanism 12. On the other hand, during the contraction stroke of the piston rod 4, the check valve 15a is closed. Thus, because the bores 19a and the openings 22b are closed to each other, the bypass passage 9 is closed. Accordingly, the hydraulic fluid flows through only the main hydraulic fluid passage 6, so that a large damping force is generated by the action of the damping force generating mechanism 7. Thus, "soft" damping force characteristics are obtained during the extension stroke, while "hard" damping force characteristics are obtained during the retraction stroker as shown by the curves A in FIG. 7.

When the shutter 20a is rotated in one direction from the above-described position so that the area of the passage defined between the bores 18a and the openings 22a is reduced, while the bores 19a and the openings 22b are open to each other, during the extension stroke of the piston rod 4, the hydraulic fluid in the cylinder upper chamber flows toward the cylinder lower chamber through the bypass passage 9 in the same way as described above, so that the damping force increases (i.e., the slope of the valve characteristic curve increases) by an amount corresponding to the decrease in the area of the communicating passage defined between the bores 18a and the openings 22a. On the other hand, during the retraction stroke of the piston rod 4, the hydraulic fluid in the cylinder lower chamber flows through the bypass passage 9 as follows. The hydraulic fluid first opens and the check valve 12a, and closes the check valve 15a, and then passes through the hydraulic fluid passage 17a, the bores 19a and the openings 22b. Further, the hydraulic fluid opens the check valve 14a and flows into the cylinder upper chamber 2a. Accordingly, that portion of each bore 19a which is open to the associated opening 22b forms an orifice, so that a small damping force (orifice characteristics) corresponding to the area of that portion (communicating passage) is generated. Thus, "medium" damping force characteristics are obtained during both the extension and retraction strokes, as shown by the curves B in FIG. 7.

When the shutter 20a is further rotated in the same direction from the above-described position and until the bores 18a and the openings 22a are fully closed to each other, while the bores 19a and the openings 22b are fully open, during the extension stroke of the piston rod 4, the check valve 14a is closed. Thus, because the bores 18a and the openings 22a are closed to each other, the bypass passage 9 is closed. Accordingly, the hydraulic fluid flows through only the main hydraulic fluid passage 6, so that a large damping force is generated by the action of the damping force generating mechanism 7. On the other hand, during the retraction stroke of the piston rod 4, the hydraulic fluid in the cylinder lower chamber flows toward the cylinder upper chamber through the bypass passage 9 in the same way as described above. Accordingly, the damping force (orifice characteristics) decreases by an amount corresponding to the increase in the area of the communicating passage defined between the bores 19a and the openings 22b. Thus, "hard" damping force characteristics are obtained during the extension stroke, while "soft" damping force characteristics are obtained during retraction stroke, as shown by the curves C in FIG. 5.

In this way, different damping force characteristics can be established during the extension and retraction strokes in the same way as in the first embodiment. Further, it is possible to continuously change the area of the communicating passage defined by and between the bores 18 a and the openings 22a and that defined by and between the bores 19a and the openings 22b in accordance with the angle of rotation of the shutter 20a. Therefore, the damping force characteristics can be controlled continuously by varying the sectional area of the bypass passage 9 during each of the extension and retraction strokes. The embodiment may also be so configured that "hard" damping force characteristics are established during both the extension and retraction strokes by closing the bores 18a and 19a with the shutter 20a to thereby close the bypass passage 9.

FIGS. 6A and 6B show one example of a method for producing the shutter 20a. In this example, the shutter 20 comprises three tubular members 20aA, 20aB and 20aC having the same diameters. The tubular members have inner tubular portions 20b integrally formed with outer peripheral portions. The control rod 23a extends through these inner tubular members. The lower end of the rod 23a is enlarged by plastic deformation so that the tubular members 20aA, 20aB and 20aC are kept in position on the rod. The openings 22a (only one of them being shown in FIG. 6A) is formed at the interface between the tubular members 20aA and 20aB and the openings 22b are formed at the interface between the tubular members 20aB and 20aC.

The tubular members are made of sintered metal. The side surfaces of each of the tubular members are parallel to their axes so that the tubular members may be formed by stroking upper and lower dies to compact metal powder without relying on any additional process. In other words, the tubular members have such a configuration that upper and lower dies are not prevented from retracting from the tubular members after compressing metal powder to form them.

In FIGS. 6A and 6B, each of the openings 22a comprises a recess in the shape of half of a triangle formed in the lower end surface of the tubular member 20aA and another recess in the shape of half of a triangle formed in the upper end surface of the lower tubular member 20aB. The tubular members are so positioned that the recesses are aligned to form the opening 22a. It will be appreciated, however, that the opening 22a may comprise only one triangular recess formed in only one of the contracting surfaces of the tubular members 20aA and 20aB. The openings 22a and 22b may have any shape that allows the portions of the dies for forming the recesses in the end surfaces of the tubular members to be withdrawn from the tubular members after compacting the metal powder for forming the members.

The guide member 13a may also comprise a plurality of members similar to the shutter.

Next, one example of the bouncing control of a semiactive suspension system that employs the first embodiment of the damping force control type of hydraulic shock absorber 1 will be described.

Neutral ranges $N_1$ and $N_2$ ($N_2 > N_1$) are set in the vicinity of the neutral position N in the stroke of the piston rod 4. The stroke S is detected with a vehicle height sensor, and a switching signal is output from a controller in accordance with the detected stroke S to activate an actuator so as to change the position of the shutter 20. The shutter 20 is controlled as follows. When the stroke S is in the neutral range $N_1$, the shutter 20 is set in the position A; when the stroke S passes out of the neutral range $N_2$ during the extension stroke, the shutter 20 is set in the position B; and when the stroke S passes out of the neutral range $N_2$ during the retraction stroke, the shutter 20 is set in the position C. It should be noted that the reason why the two neutral ranges satisfy the relation of $N_2 >_1$ is to prevent hunting.

Figure 8:
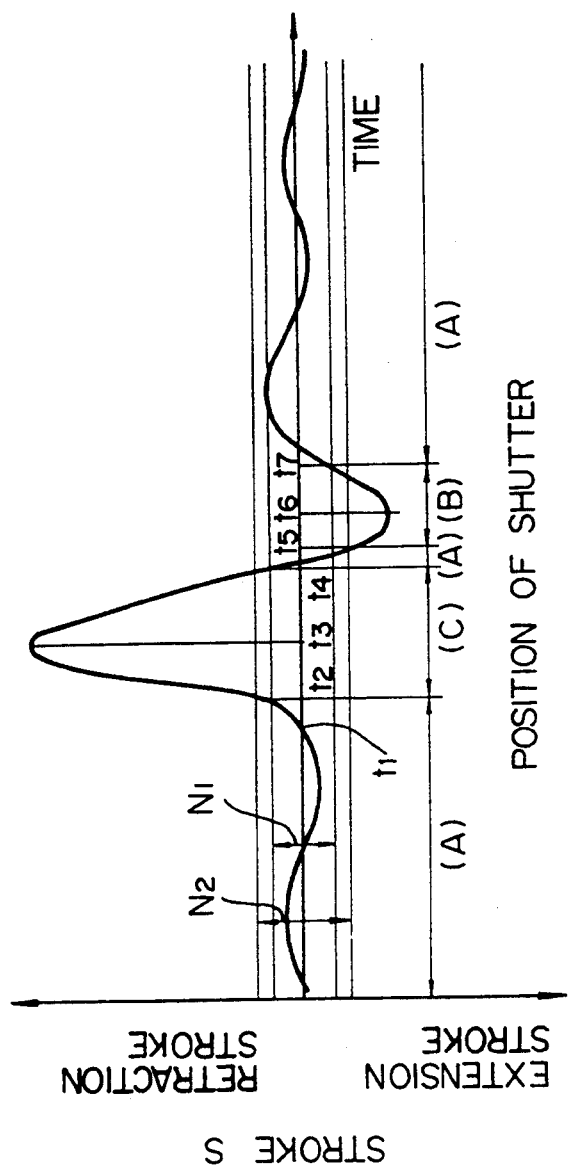
FIG. 8 is a graph of the stroke change and the shutter position relative to time when the hydraulic shock absorber, shown in FIG. 1, is controlled by a suspension control system.

With such control, the bouncing of the vehicle body is suppressed, for example, when the vehicle, which is running on a level road, rides over a bump on the road surface. That is, as shown in FIG. 8, when the vehicle is running on the level road, the stroke S of the piston rod 4 is within the neutral range $N_1$. Therefore, the shutter 20 is in the position A, so that "soft" damping force characteristics are obtained during both the extension and retraction strokes. Assuming that the vehicle rides over a bump on the road surface at time $t_1$, causing the piston rod 4 to retract a substantial degree, and the stroke S comes out of the neutral range $N_2$ during the retraction stroke at time $t_2$, the position of the shutter 20 changes from A to C in response to a control signal, but the damping force characteristics remain "soft". If the stroke S shifts from the retracted to the extended state at time $t_3$, the damping force characteristics automatically change to "hard" damping force characteristics without the aid of a control signal. If the stroke S returns to the neutral range $N_1$ at time $t_4$, the position of the shutter 20 changes from C to A in response to a control signal, so that the damping force characteristics become "soft". If the stroke S comes out of the neutral range $N_2$ during the extension stroke at time $t_5$, the position of the shutter 20 changes from A to B in response to a control signal, but the damping force characteristics remain "soft". If the stroke S shifts from the extended to the retracted state at time $t_6$, the damping force characteristics automatically change to "hard" damping force characteristics without the aid of a control signal. If the stroke S returns to the neutral range $N_1$ at time $t_7$, the position of the shutter 20 changes from B to A in response to a control signal, so that the damping force characteristics become "soft". In this way, the bouncing of the vehicle body is suppressed.

In this control operation, the changeover of the damping force characteristics in response to a control signal, which is based on the detection of the stroke S with the vehicle height sensor, is necessary only when the stroke S crosses the boundary of the neutral range $N_1$ or $N_2$ (i.e., time $t_2$, $t_4$, $t_5$ and $t_7$). When the piston changes from the contracted state to the extended state (time $t_3$) and when the piston changes from the extended state changes to the retracted state (time $t_6$), the damping force characteristics automatically change from one to another in an instant without the aid of a control signal. Accordingly, the frequency at which the damping force characteristics are switched by means of a control signal is comparatively low, so that the response lag of the controller is minimal. Thus, an adequate control can be effected.

A third embodiment of the present invention will be described below. In the third embodiment, members which are similar or equivalent to those of the first embodiment are denoted by the same reference numerals as those used in the first embodiment, and mostly only the portions in which the third embodiment differs from the first embodiment will be described in detail.

Figure 9:
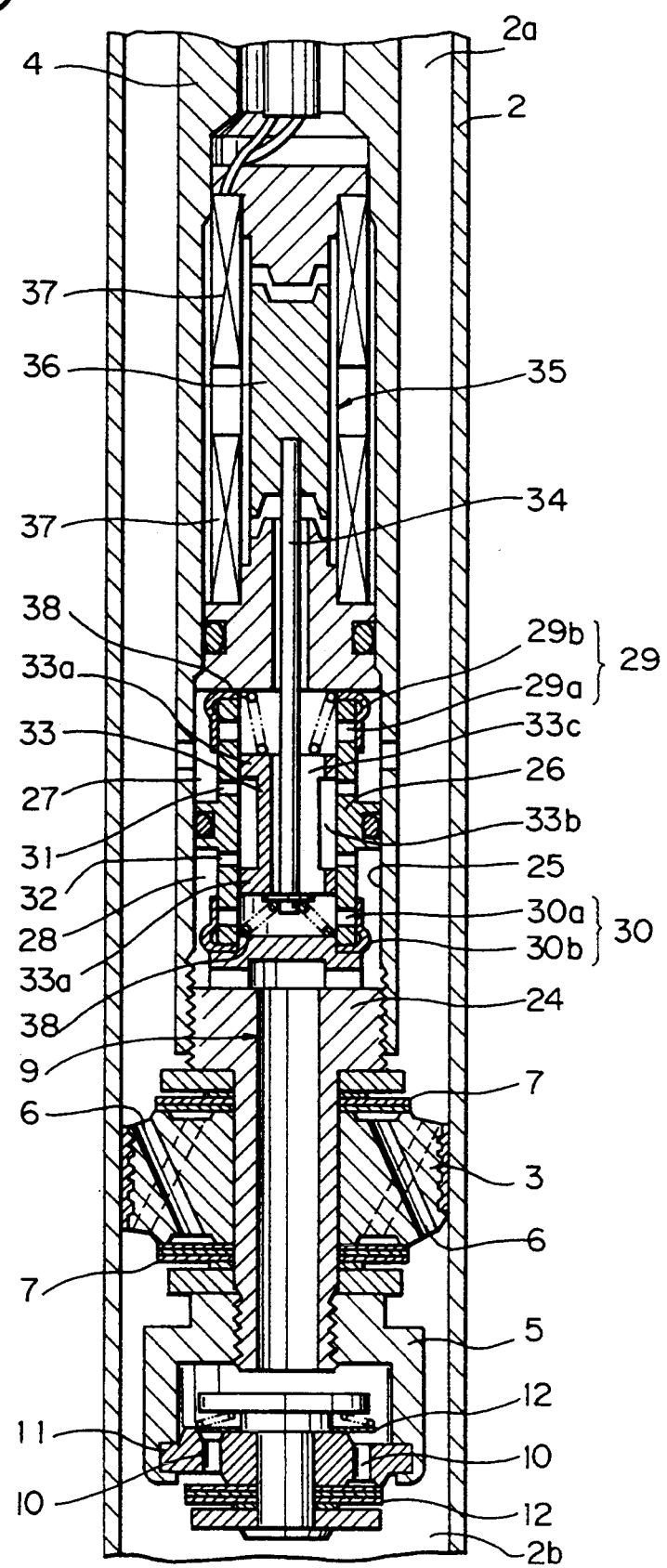
FIG. 9 is a vertical sectional view of an essential part of a third embodiment of the damping force control type of hydraulic shock absorber according to the present invention.

Referring to FIG. 9, a small-diameter passage member 24 extends through the piston 3, and the passage member 5 is screwed onto the distal end portion of the passage member 24. The piston rod 4 is connected to the proximal end portion of the small-diameter passage member 24. The piston rod 4 is formed therein with a hydraulic fluid passage 25 which communicates at one end thereof with the inside of the small-diameter passage member 24 and which opens at the other end thereof into the cylinder upper chamber 2a. The interior of the passage member 5, the interior of the small-diameter passage member 24 and the hydraulic fluid passage 25 constitute a bypass passage 9 that places the cylinder upper and lower chambers 2a and 2b in communication with each other.

A cylindrical guide member 26 is fitted in the hydraulic fluid passage 25 of the piston rod 4. Around the outer peripheral portion of the guide member 26 are formed a hydraulic fluid passage 27 that communicates with that portion of the bypass passage 9 which is closer to the cylinder upper chamber 2a, and a hydraulic fluid passage 28 which communicates with that portion of the bypass passage 9 which is closer to the cylinder lower chamber 2b. The guide member 26 has bores 29a and 30a provided in the side wall thereof at respective positions adjacent the ends of the guide member 26. The bores 29a and 30a cooperate with plate-shaped spring members 29b and 30b, which close the bores 29a and 30a from the outside of the guide member 26, to constitute check valves 29 and 30, serving as first and second check valves, which allow hydraulic fluid to flow from the inside of the guide member 26 to the hydraulic fluid passages 27 and 28. The central part of the side wall of the guide member 26 is provided with bores 31 that communicate with the hydraulic fluid passage 27, and bores 32 that communicate with the hydraulic fluid passage 28. The guide member 26 has a cylindrical shutter 33 slidably fitted therein. The shutter 33 is formed at each end thereof with a large-diameter portion 33a which is in contact with the inner wall of the guide member 26, thereby forming a valve chamber 33b between the shutter 33 and the guide member 26. The shutter 33 is provided with an axial through-bore 33c, which places the valve chamber 33b in communication with chambers which are formed between the guide member 26 and two ends of the shutter 33.

When the shutter 33 is in the neutral (position A), shown in FIG. 9, the bores 31 and 32 and the valve chamber 33b communicate with each other, so that hydraulic fluid bypasses the check valves 29 and 30 via the hydraulic fluid passage 27, the bores 31, the valve chamber 33b, the bores 32 and the hydraulic fluid passage 28. Thus, the passages that constitute the bypass passage 9 communicate with each other at all times during the extending and retracting movement of the piston rod 4. When the shutter 33 moves upwardly so that the large-diameter portion 33a closes the bores 32 (position B), hydraulic fluid bypasses the check valve 29 via the hydraulic fluid passage 27, the bores 31 and the valve chamber 33b, and the passages constituting the bypass passage 9 communicate with each other through the check valve 30. When the shutter 33 moves downwardly so that the large-diameter portion 33a closes the bores 31 (position C), hydraulic fluid bypasses the check valve 30 via the hydraulic fluid passage 28, the bores 32 and the valve chamber 33b, and the passages constituting the bypass passage 9 communicate with each other through the check valve 29.

In addition, the shutter 33 has one end of a control rod 34 connected thereto. The other end of the control rod 34 is connected to a plunger 36 of a solenoid actuator 35 that incorporated in the piston rod 4. The shutter 33 is normally placed in the neutral position A by the action of a spring 38. By supplying electric power to a solenoid 37, the shutter 33 can be selectively moved to the positions B and C.

The operation of the third embodiment will be described below.

When the shutter 33 is in the neutral position A, the passages of the bypass passage 9 communicate with each other at all times during the extending and retracting movement of the piston rod 4. Therefore, during both the extension and retraction strokes, the hydraulic fluid in the cylinder 2 flows through the main hydraulic fluid passage 6 and the bypass passage 9 in response to the sliding movement of the piston 3, so that a relatively small damping force is generated by the action of the first and second damping force generating mechanisms 7 and 12, in the same way as in the first embodiment. Thus, "soft" damping force characteristics are obtained during both the extension and retraction strokes, as shown by the curves A in FIG. 4.

When the shutter 33 is in the upper position B, the passages constituting the bypass passage 9 communicate with each other through the check valve 30. Therefore, during the extension stroke, the hydraulic fluid in the cylinder 2 flows through the main hydraulic fluid passage 6 and the bypass passage 9, so that a relatively small damping force is generated by the action of the first and second damping force generating mechanisms 7 and 12, in the same way as in the first embodiment. On the other hand, during the retraction stroke, the flow of the hydraulic fluid through the bypass passage 9 is prevented. Accordingly, the hydraulic fluid in the cylinder 2 flows through only the main hydraulic fluid passage 6, so that a relatively large damping force is generated by the action of the first damping force generating mechanism 7. Thus, "soft" damping force characteristics are obtained during the extension stroke, while "hard" damping force characteristics are obtained during the retraction stroke side, as shown by the curves B in FIG. 4.

When the shutter 33 is in the lower position C, the passages constituting the bypass passage 9 communicate with each other through the check valve 29. Therefore, during the retraction stroke, tile hydraulic fluid in the cylinder 2 flows through the main hydraulic fluid passage 6 and the bypass passage 9, so that a relatively small damping force is generated by the action of the first and second damping force generating mechanisms 7 and 12, in the same way as in the first embodiment. On the other hand, during the extension stroke, the hydraulic fluid is prevented from flowing through the bypass passage 9. Accordingly, the hydraulic fluid in the cylinder 2 flows through only the main hydraulic fluid passage 6, so that a relatively large damping force is generated by the action of the first damping force generating mechanism 7. Thus, "hard" damping force characteristics are obtained during the extension stroke, while "soft" damping force characteristics are obtained during the retraction stroke, as shown by the curves C in FIG. 4.

In this way, the damping force characteristics can be selected from among three different combinations by moving the shutter 33 in the same way as in the first embodiment.

In the third embodiment, the damping force generating mechanisms 12 may be omitted if the bores 29a and 30a are configured to act as flow-restricting orifices.

A fourth embodiment of the present invention will be described below.

Figure 10:
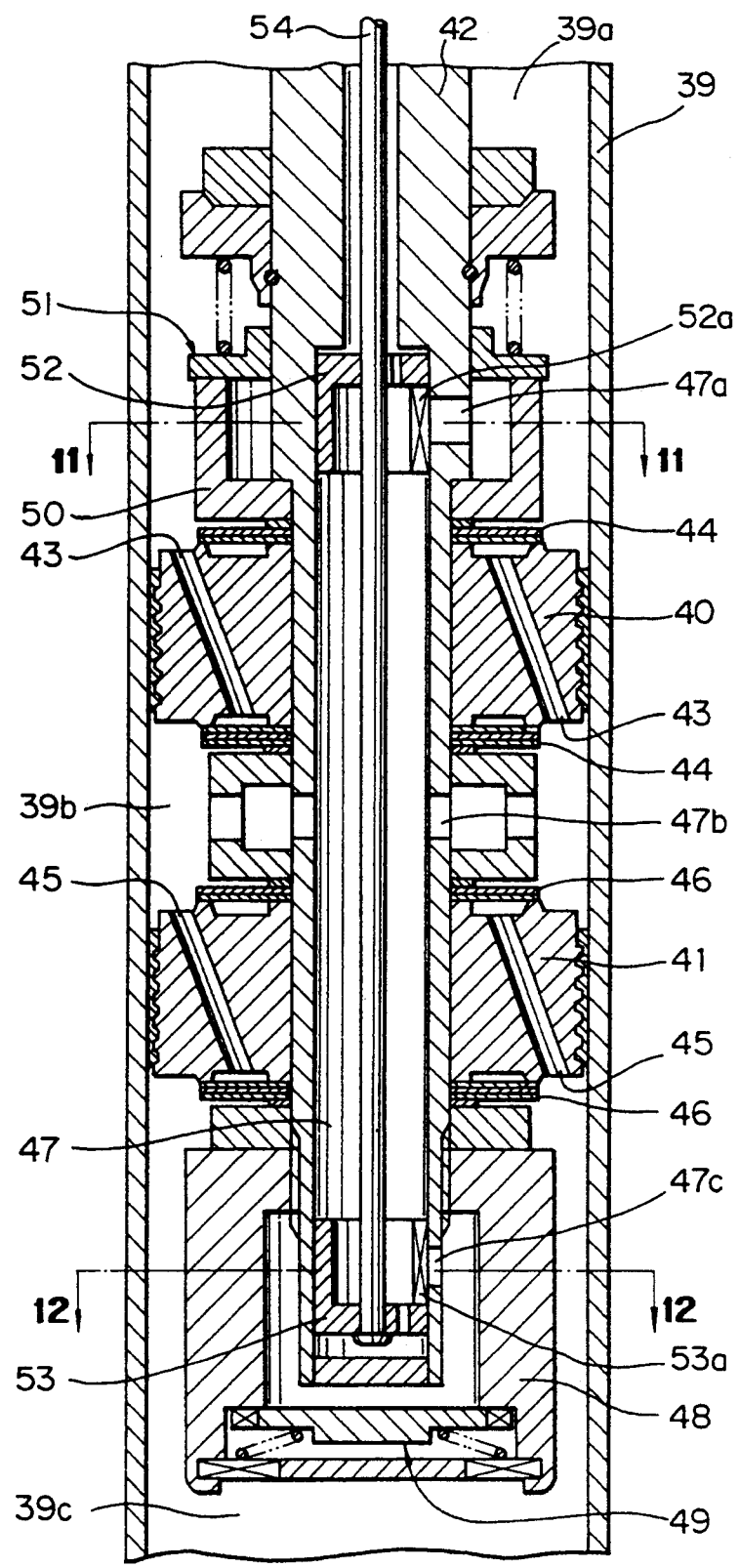
FIG. 10 is a vertical sectional view of an essential part of a fourth embodiment of the damping force control type of hydraulic shock absorber according to the present invention.

As shown in FIG. 10, a cylinder 39 has a hydraulic fluid sealed therein, and a pair of first and second serially disposed pistons 40 and 41 are slidably fitted in the cylinder 39. The first and second pistons 40 and 41 form a hydraulic fluid chamber defining member that divides the inside of the cylinder 39 into three chambers, that is, a cylinder upper chamber 39a, a cylinder middle chamber 39b, and a cylinder lower chamber 39c. One end portion of a piston rod 42 extends through pistons 40 and 41 and is connected thereto. The other end of the piston rod 42 extend as far as the outside of the cylinder 39. The cylinder 39 is provided with a reservoir chamber (not shown) for compensating for a change in the amount of hydraulic fluid in the cylinder 39 that corresponds to the amount by which the piston rod 42 enters or withdraws from the cylinder 39.

The first piston 40 is provided with hydraulic fluid passages 43 which place the cylinder upper and middle chambers 39a and 39b in communication with each other. The end faces of the first piston 40 are provided with a first damping force generating mechanism 44 comprising an orifice and disk valves, which control the flow of the hydraulic fluid in the hydraulic fluid passage 43 so as to generate a damping force. The second piston 41 is provided with hydraulic fluid passages 45 which place the cylinder middle and lower chambers 39b and 39c in communication with each other. The end faces of the second piston 41 are provided with a second damping force generating mechanism 46 comprising an orifice and disk valves, which control the flow of the hydraulic fluid in the hydraulic fluid passage 45 so as to generate a damping force. The hydraulic fluid passages 43 and 45 and the cylinder middle chamber 39b constitute a main hydraulic fluid passage.

The piston rod 42 is provided with a bypass passage 47 that extends axially from the distal end of the piston rod 42, and openings 47a, 47b and 47c which communicate with the cylinder upper, middle and lower chambers 39a, 39b and 39c, respectively. That portion of the bypass passage 47 which places the cylinder upper and middle chambers 39a and 39b in communication with each other constitutes a first bypass passage that bypasses the first damping force generating mechanism 44. That portion of the bypass passage 47 which places the cylinder middle and lower chambers 39b and 39c in communication with each other constitutes a second bypass passage that bypasses the second damping force generating mechanism 46. Further, the piston rod 42 has a cylindrical passage member 48 attached to the distal end portion thereof, and the open end portion of the passage member 48 is provided with a check valve 49 that allows hydraulic fluid to flow from the opening 47c of the bypass passage 47 toward the cylinder lower chamber 39c and prevents the hydraulic fluid from flowing in the reverse direction.

In addition, a cylindrical passage member 50 surrounds the opening 47a, and the open end portion of the passage member 50 is provided with a check valve 51 that allows hydraulic fluid to flow from the opening 47a of the bypass passage 47 toward the cylinder upper chamber 39a and that prevents the hydraulic fluid from flowing in the reverse direction.

Further, a shutter 52, which is in the shape of a cylinder one end of which is closed, is rotatable fitted in the passage 47 formed in the piston rod 42 so as to face the opening 47a. Similarly, a shutter 53, which is in the shape of a cylinder one end of which is closed, is rotatable fitted in the bypass passage 47 so as to face the opening 47c. The side wall of the shutter 52 is provided with a slit 52a so that the opening 47a can be selectively opened and closed by bringing the slit 52a into and out of alignment with the opening 47a by rotating the shutter 52. Similarly, the side wall of the shutter 53 is provided with a slit 53a so that the opening 47c can be selectively opened and closed by bringing the slit 53a into and out of alignment with the opening 47c by rotating the shutter 53.

The shutters 52 and 53 are connected to a control rod 54 that extends along the axis of the piston rod 42. The control rod 54 extends along the piston rod 42 as far as the outside of the hydraulic shock absorber. The shutters 52 and 53 are rotated simultaneously by actuating the control rod 54 from the outside of the hydraulic shock absorber.

As shown in FIGS. 11 and 12, the openings 47a and 47c of the bypass passage 47 open in respective directions which are different from each other so that these openings 47a and 47c are placed in communication with and are cut off from the associated slits 52a and 53a in accordance with the respective positions of the shutters 52 and 53. That is, when the shutters 52 and 53 are in the respective positions (a) shown in FIGS. 11(a) and 12(a), the slit 52a and the opening 47a communicate with each other, and the slit 53a and the opening 47c also communicate with each other; when the shutters 52 and 53 are in the positions (b) shown in FIGS. 11(b) and 12(b), the slit 52a and the opening 47a are cut off from each other, while the slit 53a and the opening 47c communicate with each other; when the shutters 52 and 53 are in the positions (c) shown in FIGS. 11(c) and 12(c), the slit 52a and the opening 47a communicate with each other, while the slit 53a and the opening 47c are cut off from each other; and when the shutters 52 and 53 are in the positions (d) shown in FIGS. 11(d) and 12(d), the slit 52a and the opening 47a are cut off from each other, and the slit 53a and the opening 47c are also cut off from each other.

The operation of the fourth embodiment described, will be explained below.

Figure 13:
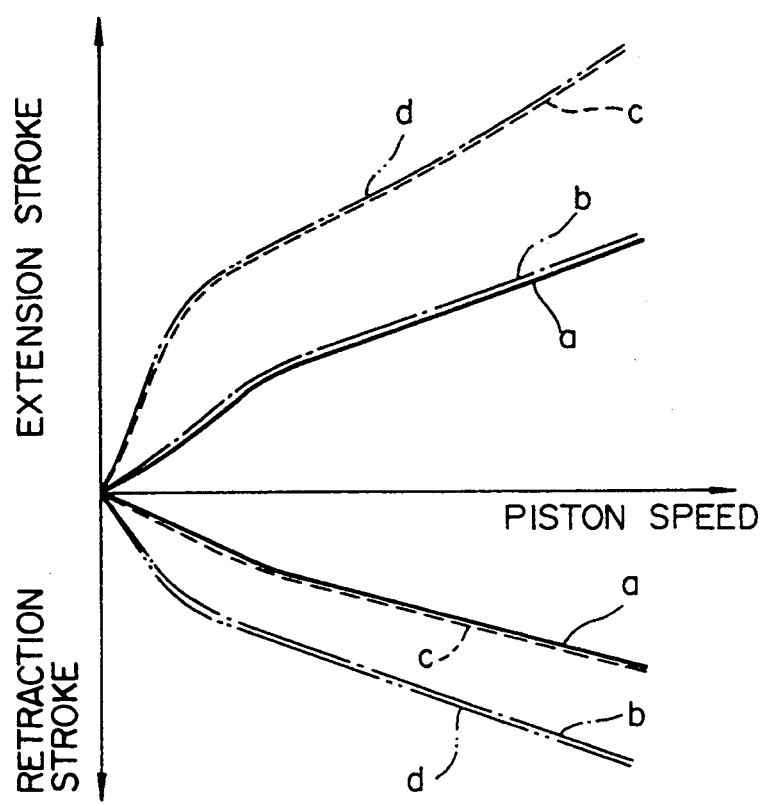
FIG. 13 is a graph of damping force characteristics of the hydraulic shock absorber, shown in FIG. 10.

When the shutters 52 and 53 are in the positions (a), both the openings 47a and 47c of the bypass passage 47 are open. Therefore, during the extension stroke of the piston rod 42, the check valve 51 is closed, so that the hydraulic fluid in the cylinder upper chamber 39a flows into the cylinder middle chamber 39b through the hydraulic fluid passage 43 in the first piston 40, while the hydraulic fluid in the cylinder middle chamber 39b passes through the opening 47b, the bypass passage 47 and the opening 47c, opens the check valve 49 and flows into the cylinder lower chamber 39c. Thus, a relatively small damping force is generated by the action of only the first damping force generating mechanism 44 provided on the first piston 40. On the other hand, during the retraction stroke, the check valve 49 is closed, so that the hydraulic fluid in the cylinder lower chamber 39c flows into the cylinder middle chamber 39b through the hydraulic fluid passage 45 in the second piston 41, while the hydraulic fluid in the cylinder middle chamber 39b passes through the opening 47b, the bypass passage 47 and the opening 47a, opens the check valve 51, and flows into the cylinder upper chamber 39a. Accordingly, a relatively small damping force is generated by the action of only the second damping force generating mechanism 46 provided on the second piston 41. Thus, "soft" damping force characteristics are obtained during both the extension and retraction strokes, as shown by the curves a in FIG. 13.

When the shutters 52 and 53 are in the positions (b), the opening 47a of the bypass passage 47 is closed, whereas the opening 47c is open. Therefore, during the extension stroke of the piston rod 42, the hydraulic fluid in the cylinder upper chamber 39a flows into the cylinder middle chamber 39b through the hydraulic fluid passage 43 in the first piston 40, while the hydraulic fluid in the cylinder middle chamber 39b passes through the opening 47b, the bypass passage 47 and the opening 47c, opens the check valve 49, and flows into cylinder lower chamber 39c, in the same way as in the case of the positions (a). Accordingly, a relatively small damping force is generated by the action of only the first damping force generating mechanism 44 provided on the first piston 40. On the other hand, during the retraction stroke, the check valve 49 is closed, so that the bypass passage 47 is closed. Therefore, the hydraulic fluid flows through the hydraulic fluid passages 43 and 45 in the first and second pistons 40 and 41, so that a relatively large damping force is generated by the action of the first and second damping force generating mechanisms 44 and 46, which are disposed in series. Thus, "soft" damping force characteristics are obtained during the extension stroke while "hard" damping force characteristics are obtained during the retraction stroke, as shown by the curves b in FIG. 13.

When the shutters 52 and 53 are in the positions (c), the opening 47a of the bypass passage 47 is open, whereas the opening 47c is closed. Therefore, during the retraction stroke of the piston rod 42, the hydraulic fluid in the cylinder lower chamber 39c flows into the cylinder middle chamber 39b through the hydraulic fluid passage 45 in the second piston 41 while the hydraulic fluid in the cylinder middle chamber 39b passes through the opening 47b, the bypass passage 47 and the opening 47a, opens the check valve 51, and flows into the cylinder upper chamber 39a, in the same way as in the case of the positions (a). Accordingly, a relatively small damping force is generated by the action of only the second damping force generating mechanism 46 provided on the second piston 41. On the other hand, during the extension stroke, the check valve 51 is closed, so that the bypass passage 47 is closed. Therefore, the hydraulic fluid flows through the hydraulic fluid passages 43 and 45 in the first and second pistons 40 and 41, so that a relatively large damping force is generated by the action of the first and second damping force generating mechanisms 44 and 46, which are disposed in series, in the same way as in the case of the positions (c). Thus, "soft" damping force characteristics are obtained during the retraction stroke, while "hard" damping force characteristics are obtained during the extension stroke, as shown by the curves c in FIG. 10.

When the shutters 52 and 53 are in the positions (d), both of the openings 47a and 47c of the bypass passage 47 are closed so that the bypass passage 47 is closed at all times during the extending and retracting movement of the piston rod 42. Accordingly, during both the extension and retraction strokes, the hydraulic fluid flows through the hydraulic fluid passages 43,and 45 in the first and second pistons 40 and 41, so that a relatively large damping force is generated by the action of both the first and second damping force generating mechanisms 44 and 46, which are disposed in series. Thus, "hard" damping force characteristics are obtained during both the extension and retraction strokes, as shown by the curves d in FIG. 10.

Thus, by moving the shutters 52 and 53 with the control rod 54, the damping force characteristics can be selected from among four different combinations, that is, the three different combinations in the first, second and third embodiments, plus the damping force characteristics, which are "hard" during both the extension and retraction strokes.

Although in the foregoing fourth embodiment, a hydraulic fluid chamber defining member is constituted by the first piston 40, which is provided with the first damping force generating mechanisms 44, and the second piston 41, which is provided with the second damping force generating mechanisms 46, it should be noted that the described hydraulic fluid chamber defining member is not necessarily so limited and that a hydraulic fluid chamber defining member may be formed by using only the first piston 40. In this case, a closed chamber through which the hydraulic fluid passage 43 and the opening 47b communicate with each other is provided below the first piston 40, and a second damping force generating mechanism is provided where this closed chamber and the cylinder lower chamber 39c communicate with each other.

A fifth embodiment of the present invention will be described below. Since the fifth embodiment differs from the first embodiment only in the structure of the bypass passage, members of this embodiment which are similar or equivalent to those in the first embodiment are denoted by the same reference numerals as those in the first embodiment, and mostly only the portions in which the fifth embodiment differs from the first embodiment will be described in detail.

Figure 14:
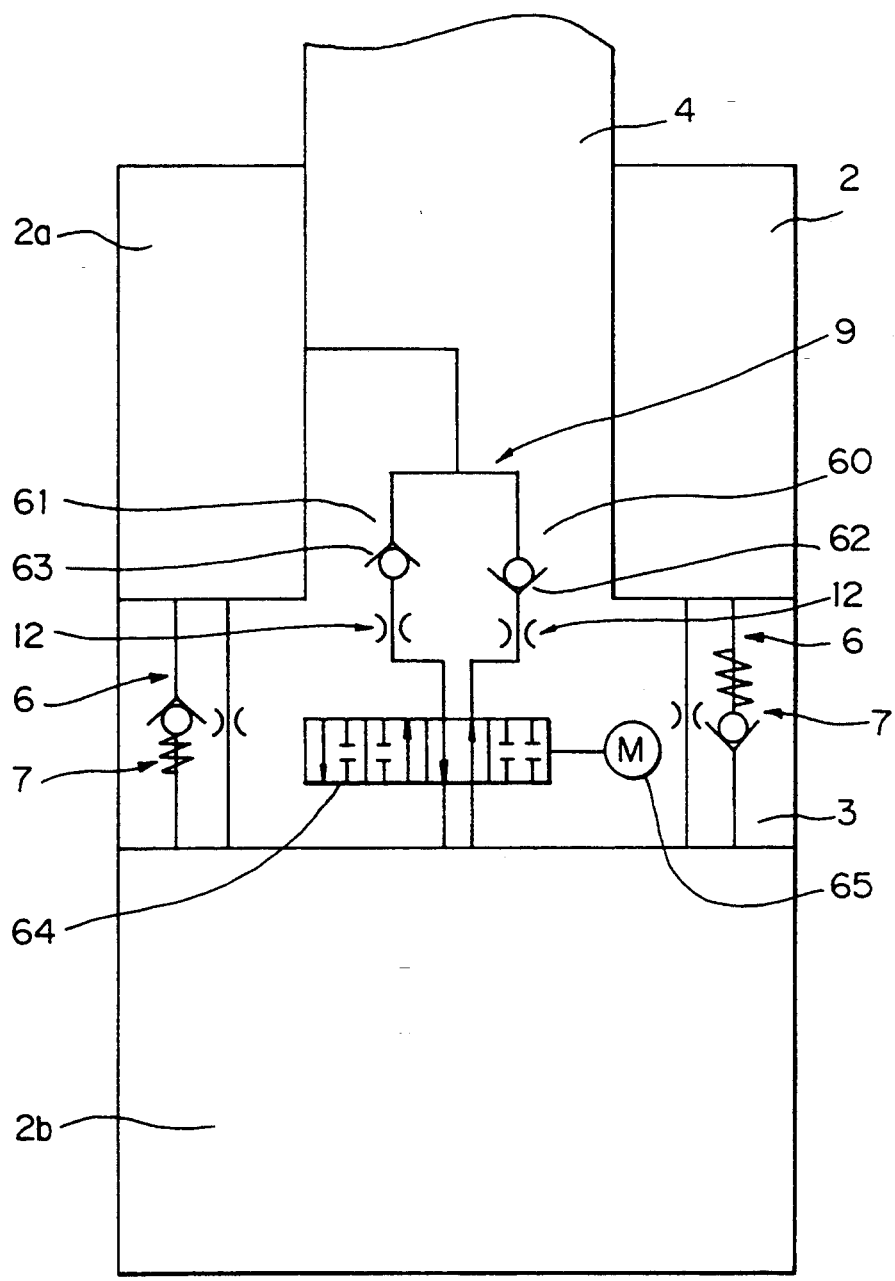
FIG. 14 is a schematic diagram of an essential part of a fifth embodiment of the damping force control type of hydraulic shock absorber according to the present invention.

As shown in FIG. 14, a cylinder 2, which has a hydraulic fluid sealed therein, slidably receives a piston 3 having a piston rod 4 connected thereto, thereby dividing the inside of the cylinder 2 into two chambers, i.e., a cylinder upper chamber 2a and a cylinder lower chamber 2b. The piston 3 is provided with main hydraulic fluid passages 6 which place the cylinder upper and lower chambers 2a and 2b in communication with each other. The piston 3 is further provided with a bypass passage 9 which extends along the piston rod 4 to also place the cylinder upper and lower chambers 2a and 2b in communication with each other. The main hydraulic fluid passages 6 are provided with first damping force generating mechanisms 7 (which generate a relatively large damping force), while the bypass passage 9 is provided with second damping force generating mechanisms 12 (which generate a relatively small damping force).

The bypass passage 9 comprises a pair of first and second passages 60 and 61, which are arranged in parallel. The first passage 60 is provided with a first check valve 62 that allows hydraulic fluid to flow from the cylinder lower chamber toward the cylinder upper chamber, while the second passage 61 is provided with a second check valve 63 that allows hydraulic fluid to flow from the cylinder upper chamber toward the cylinder lower chamber. Further, the first and second passages 60 and 61 are provided with a four-port, four-position switching valve 64 so that each of the two passages can be opened and closed. Reference numeral 65 in FIG. 11 denotes a motor for changing the position of the switching valve 64.

With this arrangement, when both the first and second passages 60 and 61 are opened by actuating the switching valve 64, the passages that constitute the bypass passage 9 communicate with each other at all times during the extending and retracting movement of the piston rod 4. Accordingly, during both the extension and retraction strokes, the hydraulic fluid flows through the main hydraulic fluid passage 6 and the bypass passage 9, so that a relatively small damping force is generated. Thus, "soft" damping force characteristics are obtained during both the extension and retraction strokes.

When the first passage 60 is closed with the second passage 61 being open, the passages that constitute bypass passage 9 communicate with each other through the second check valve 63. Therefore, during the extension stroke, the hydraulic fluid flows through the main hydraulic fluid passage 6 and the bypass passage 9, so that a relatively small damping force is generated. On the other hand, during the retraction stroke, the hydraulic fluid is prevented from flowing through the bypass passage 9. Therefore, the hydraulic fluid flows through only the main hydraulic fluid passage 6, so that a relatively large damping force is generated. Thus, "soft" damping force characteristics are obtained during the extension stroke, while "hard" damping force characteristics are obtained during the retraction stroke.

When the first passage 60 is open with the second passage 61 being closed, the passages constituting the bypass passage 9 communicate with each other through the first check valve 62. Therefore, during the retraction stroke, the hydraulic fluid flows through the main hydraulic fluid passage 6 and the bypass passage 9, so that a relatively small damping force is generated. On the other hand, during the extension stroke, the hydraulic fluid is prevented from flowing through the bypass passage 9. Therefore, the hydraulic fluid flows through only the main hydraulic fluid passage 6, so that a relatively large damping force is generated. Thus, "hard" damping force characteristics are obtained during the extension stroke, while "soft" damping force characteristics are obtained during the retraction stroke.

When both of the first and second passages 60 and 61 are closed, the bypass passage 9 is closed at all times during the extending and retracting movement of the piston rod 4. Therefore, during both the extension and, retraction strokes, the hydraulic fluid flows through only the main hydraulic fluid passage 6, so that a relatively large damping force is generated. Thus, "hard" damping force characteristics are obtained during both the extension and retraction strokes.

In this way, the damping force characteristics can be selected from among four different combinations by changing the position of the switching valve 64 so as to achieve the same results as in the fourth embodiment.

A sixth embodiment of the present invention will be described below. The sixth embodiment is a specific example of the present invention, which is obtained by embodying the principle of the fifth embodiment. In the sixth embodiment, members which are similar or equivalent to those in the first and fifth embodiments are denoted by the same reference numerals and mostly only the portions in which tile sixth embodiment differs from these embodiments will be explained in detail.

Figure 15:
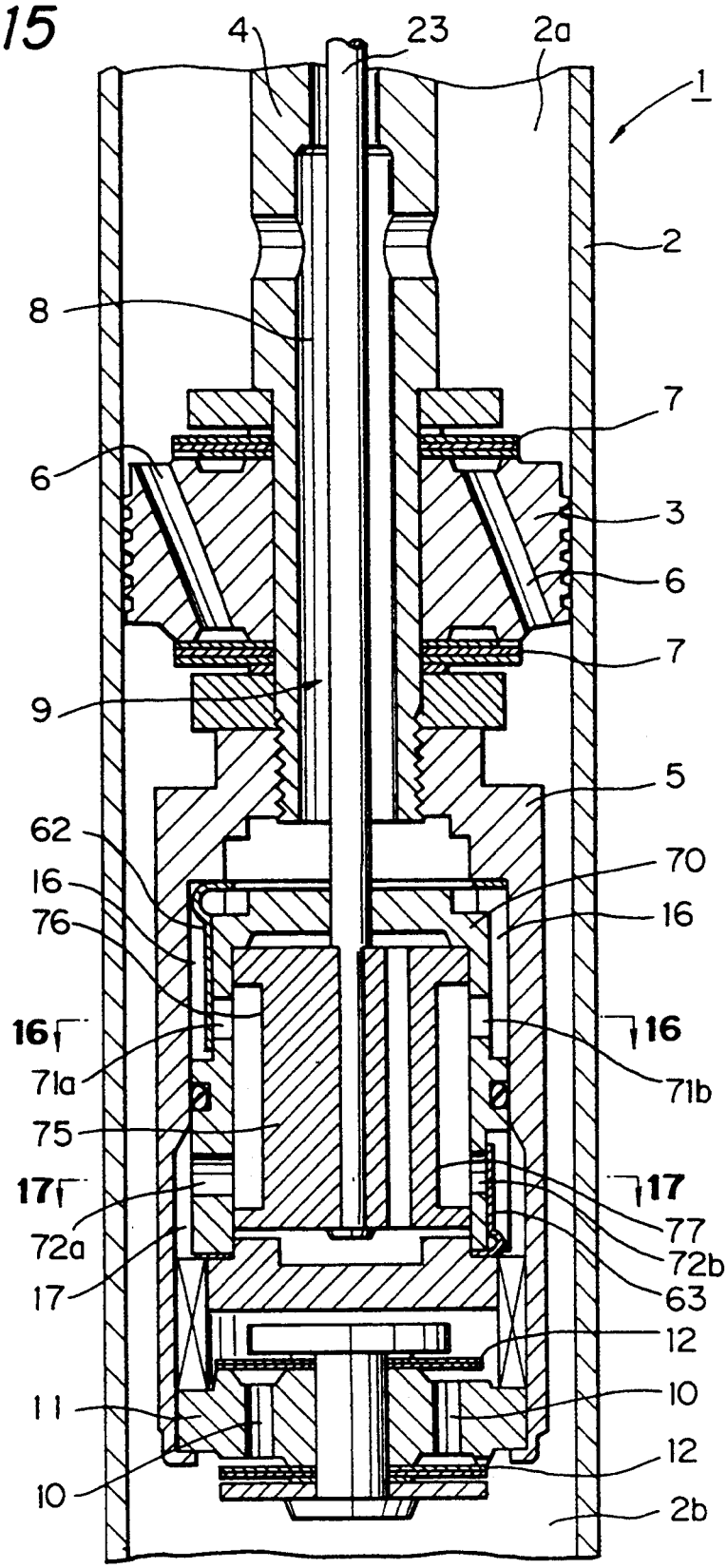
FIG. 15 is a vertical sectional view of an essential part of a sixth embodiment of the damping force control type of hydraulic shock absorber according to the present invention.

As shown in FIG. 15, the passage member 5 is fitted with a tubular guide member 70. The guide member 70 has a pair of diametrically opposing bores 71a and 71b formed in the upper part of the side wall thereof, and another pair of bores 72a and 72b, which are formed in the lower part of the side wall of the guide member 70 at positions below the bores 71a and 71b, respectively.

Further, a first check valve 62 is operatively associated with the bore 71a so as to allow hydraulic fluid to flow from the inside of the guide member 70 toward the cylinder upper chamber and to prevent hydraulic fluid from flowing in the reverse direction. In addition, a second check valve 63 is operatively associated with the bore 72b so as to allow hydraulic fluid to flow from inside of the guide member 70 toward the cylinder lower chamber and to prevent hydraulic fluid from flowing in the reverse direction. The second check valve 63 is provided at the end of the guide member 70 which is closer to the cylinder lower chamber 2b.

The guide member 70 has a substantially columnar shutter 75 rotatable fitted therein, which serves as first and second damping force control valves. The shutter 75 is attached to the distal end portion of a control rod 23 that is inserted into the guide member 70 through the bottom thereof. The shutter 75 can be rotated by actuating the control rod 23. The side portion of the shutter 75 is formed with a pair of first and second recesses 76 and 77 each extending along the circumference thereof. The first and second recesses 76 and 77 are elongate in the axial direction of the shutter 75 so that the first recess 76 can align with the bores 71a and 72a simultaneously, while the second recess 77 can align with the bores 71b and 72b simultaneously. Thus, the bypass passage 9, in which the first and second check valves 62 and 63 are provided, is opened and closed by bringing the first and second recesses 76 and 77 into and out of alignment with the pairs of bores 71a and 72a, and 71b and 72b by rotating the shutter 75.

As shown in FIGS. 16 and 17, the first and second recesses 76 and 77 of the shutter 75 are circumferentially spaced at a predetermined distance so that the first and second recesses 76 and 77 can be selectively aligned with the bores 71a and 72a, and 71b and 72b in accordance with the position of the shutter 75. That is, when the shutter 75 in a position shown (X) in FIGS. 16(a) and 17(a), the first recess 76 aligns with the bores 71 and 72a, and at the same time, the second recess 77 aligns with the bores 71b and 72b; when the shutter 75 is in a position (Y) shown in FIGS. 16(b) and 17(b), the second recess 77 aligns with the bores 71b and 72b; and when the shutter 75 is in a position at (Z) shown in FIGS. 16(c) and 17(c), the first recess 76 aligns with the bores 71a and 72a.

The operation of the sixth embodiment will be described below. In operation, the shutter 75 is rotated by actuating the control rod 23 from the outside of the damping force control type of hydraulic shock absorber 1, thereby enabling the combinations of damping force characteristics to be switched over from one to another.

Referring to FIGS. 16 and 17, when the shutter is in the position (X), the first recess 76 aligns with the bores 71a and 72a, and at the same time, the second recess 77 aligns with the bores 71b and 72b. During the extension stroke, the hydraulic fluid flows through not only the main hydraulic fluid passage 6 but also the passage 16, the bore 71b, the second recess 77, the bore 72b, the second check valve 63 and the second damping force generating mechanism 12 because the second recess 77 is in alignment with the bores 71b and 72b, so that a relatively small damping force is generated by the action of the first and second damping force generating mechanisms 7 and 12. During the retraction stroke, the hydraulic fluid flows through not only the main hydraulic fluid passage 6 but also the second damping force generating mechanism 12, the passage 17, the bore 71a, the first recess 76, the bore 72b and the first check valve 62 because the first recess 76 is in alignment with the bores 71a and 72a, so that a relatively small damping force is generated by the action of the first and second damping force generating mechanisms 7 and 12. Thus, "soft" damping force characteristics are obtained during both the extension and retraction strokes, as shown by the curves A in FIG. 4.

When the shutter 75 is in the position (Y), the second recess 77 aligns with the bores 71b and 72b. During the extension stroke, the hydraulic fluid flows through not only the main hydraulic fluid passage 6 but also the passage 16, the bore 71b, the second recess 77, the bore 72b, the second check valve 63 and the second damping force generating mechanism 12 because the second recess 77 is in alignment with the bores 71b and 72b, so that a relatively small damping force is generated by the action of the first and second damping force generating mechanisms 7 and 12. During the retraction stroke, the hydraulic fluid is prevented from flowing through the bypass passage 9. Therefore, the hydraulic fluid flows through only the main hydraulic fluid passage 6, so that a relatively large damping force is generated by the action of the first damping force generating mechanism 7. Thus, "soft" damping force characteristics are obtained during the extension stroke, while "hard" damping force characteristics are obtained during the retraction stroke, as shown by the curves B in FIG. 4.

When the shutter 75 is in the position (Z), the first recess 76 aligns with the bores 71a and 72a. During the extension stroke, hydraulic fluid is prevented from flowing through the bypass passage 9. Therefore, the hydraulic fluid flows through only the main hydraulic fluid passage 6, so that a relatively large damping force is generated by the action of the first damping force generating mechanism 7. During the retraction stroke, the hydraulic fluid flows through not only the main hydraulic fluid passage 6 but also through the second damping force generating mechanism 12, the passage 17, the bore 71a, the first recess 76, the bore 72b and the first check valve 62 because the first recess 76 is in alignment with the bores 71a and 72a, so that a relatively small damping force is generated by the action of the first and second damping force generating mechanisms 7 and 12. Thus, "hard" damping force characteristics are obtained during the extension stroke, while "soft" damping force characteristics are obtained during the retraction stroke, as shown by the curves C in FIG. 4.

In this way, the damping force characteristics can be selected from among four different combinations by rotating the shutter 75 and selecting the desired shutter position, in the same way as in the fifth embodiment.

A seventh embodiment of the present invention will be described below. In the seventh embodiment, members which are similar or equivalent to those in the first and sixth embodiments are denoted by the same reference numerals, and mostly only the portions in which the seventh embodiment differs from these embodiments will be described in detail.

Figure 18:
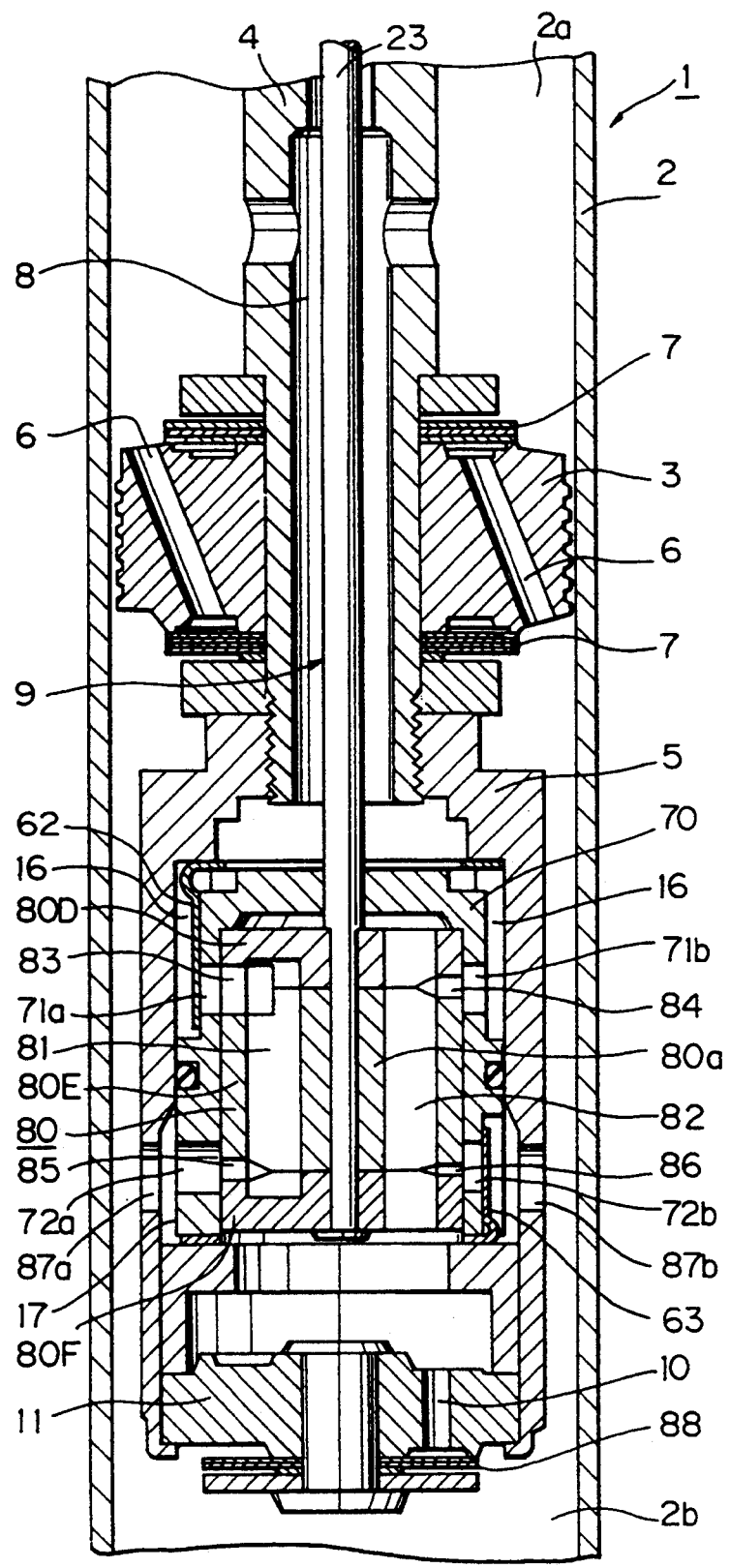
FIG. 18 is a vertical sectional view of an essential part of a seventh embodiment of the damping force control type of hydraulic shock absorber according to the present invention.

As shown in FIG. 18, the damping force control type of hydraulic shock absorber 1 in the seventh embodiment is provided with a substantially cylindrical shutter 80, which replaces the shutter 75 in the sixth embodiment. The shutter 80 has a center wall 80a defining a pair of first and second spaces 81 and 82. The upper part of the side wall of the shutter 80, which defines the first space 81, has a first upper slit 83 formed therethrough, which slit is elongate in the circumferential direction of the shutter. Similarly, the upper part of the side wall of the shutter 80, which defines the second space 82, has a second, elongate, upper slit 84 extending therethrough circumferentially of the shutter. Further, the lower part of the side wall of the shutter 80, which defines the first space 81, has a first lower slit 85 extending therethrough, which slit is elongate in the circumferential direction of the shutter, and the lower part of the side wall of the shutter 80, which defines the second space 82, also has a second, circumferentially elongate, lower slit 86 extending therethrough circumferentially of the shutter. It should be noted that an upper wall 80D and a bottom wall 80F are provided at top and bottom portions, respectively, of that part of the shutter 80 which defines the first space 81, to thereby enclose the first space 81.

As shown in FIG. 19, the first upper slit 83 is a circumferentially elongate bore having a constant width. The second upper slit 84 comprises a circumferentially elongate rectangular bore, and a triangular bore whose width decreases in the circumferential direction from the left-hand end thereof (as viewed in FIG. 19) and which is contiguous with the rectangular bore. The first lower slit 85 comprises a triangular bore whose width increases in the circumferential direction from the left-hand end thereof (as viewed in FIG. 19), and a circumferentially elongate rectangular bore which is contiguous with the triangular bore. The second lower slit 86 comprises a circumferentially elongate rectangular bore, and a triangular bore whose width decreases in the circumferential direction from the left-hand end thereof (as viewed in FIG. 19) and which is contiguous with the rectangular bore. In this embodiment, the width of the second lower slit 86 is smaller than that of the second upper slit 84.

In its initial state, the shutter 80 is set in the neutral position. When the shutter 80 is in the neutral position, the first upper, second upper, first lower and second lower slits 83, 84, 85 and 86 are in alignment with the respective bores 71a, 71b, 72a and 72b, as shown in FIG. 19. By rotating the shutter 80, each slit and its associated bore can be selectively opened to each other and cut off from each other, and it is also possible to control the degree to which each slit is open to the space 81 or 82 by a bore. Thus, it is possible to open and close the bypass passage 9, including the first and second check valves 62 and 63, and also control the flow rate of the hydraulic fluid by properly changing the relative positions of the four sets of slits and bores.

It should be noted that the shutter 80 is formed by connecting together first, second and third shutter members 80D, 80E and 80F, which are produced as discrete members.

The portion of the passage member 5, which faces the passage 17, is formed with a pair of opposing through-bores 87a and 87b to place the passage 17 in communication with the cylinder lower chamber 2b. The end of the valve body 11, which is closer to the cylinder lower chamber 2b, is provided with a second damping force generating mechanism 88 in place of the damping force generating mechanism 12 in the sixth embodiment.

The operation of the seventh embodiment will be described below. In operation, the shutter 80 is rotated by actuating the control rod. 23 from outside of the damping force control type of hydraulic shock absorber 1, thereby enabling the combinations of damping force characteristics to be switched over from one to another.

When the shutter 80 is in the neutral position, as shown in FIG. 19, the first upper, second upper, first lower and second lower slits 83, 84, 85 and 86 are in alignment with the respective bores 71a, 71b, 72a and 72b. During the extension stroke, the hydraulic fluid flows through not only the main hydraulic fluid passage 6 but also the passage 16, the bore 71b, the second upper slit 84 and the second space 82 because the second upper and lower slits 84 and 86 are in alignment with the respective bores 71b and 72b. Thereafter, the hydraulic fluid flows through the hydraulic fluid passage 10 and the second damping force generating mechanism 88 and also through the bore 72b, the second check valve 63 and the through-bore 87b. Accordingly, a relatively small damping force is generated by the action of the second lower slit 86 and the first and second damping force generating mechanisms 7 and 88. During the retraction stroke, the hydraulic fluid flows through not only the main hydraulic fluid passage 6 but also through the through-bore 87a, the passage 16, the bore 72a, the first space 81 and the first check valve 62 because the first upper and lower slits 83 and 85 are in alignment with the respective bores 71a and 72a, so that a relatively small damping force is generated by the action of the first lower slit 85 and the first damping force generating mechanism 7. Thus, "soft" damping force characteristics are obtained during both the extension and retraction strokes, as shown by the curves A in FIG. 4.

When the shutter 80 is rotated in the direction of the arrow P (leftwardly as viewed in FIG. 19) from the neutral position, the area of overlap i.e., the area of opening defined by and between the second upper slit 84 and the bore 71b decreases, and so does the area of overlap between the second lower slit 86 and the bore 72b, while the area of overlap between the first upper slit 83 and the bore 71a and that between the first lower slit 85 and the bore 72a are maintained. Since the area of overlap between the second upper slit 84 and the bore 71b and that between the second lower slit 86 and the bore 72b decrease, relatively high "hard" damping force characteristics are obtained during the extension stroke, as shown by the curve C in FIG. 4. During the retraction stroke, "soft" damping force characteristics are obtained, as shown by the curve C in FIG. 4, in the same way as in the case of the neutral position.

When the shutter 80 is rotated in the direction of the arrow Q (rightwardly as viewed in FIG. 19) from the neutral position, the area of overlap between the second upper slit 84 and the bore 71b and that between the second lower slit 86 and the bore 72b and further that between the first upper slit 83 and the bore 71a are maintained, while the area of overlap between the first lower slit 85 and the bore 72a decreases. Since the area of overlap between the second upper slit 84 and the bore 71b and that between the second lower slit 86 and the bore 72b are the same as those in the case of the neutral position, during the extension stroke, "soft" damping characteristics are obtained, as shown by the curve B in FIG. 4, in the same way as in the case of the neutral position. During the retraction stroke, since the area of overlap between the first lower slit 85 and the bore 72a decreases, relatively high "hard" damping force characteristics are obtained, as shown by the curve B in FIG. 4.

In this way, the damping force characteristics can be selected from among a large number of different combinations by rotating the shutter 80 and selecting the desired shutter position.

Figure 20:
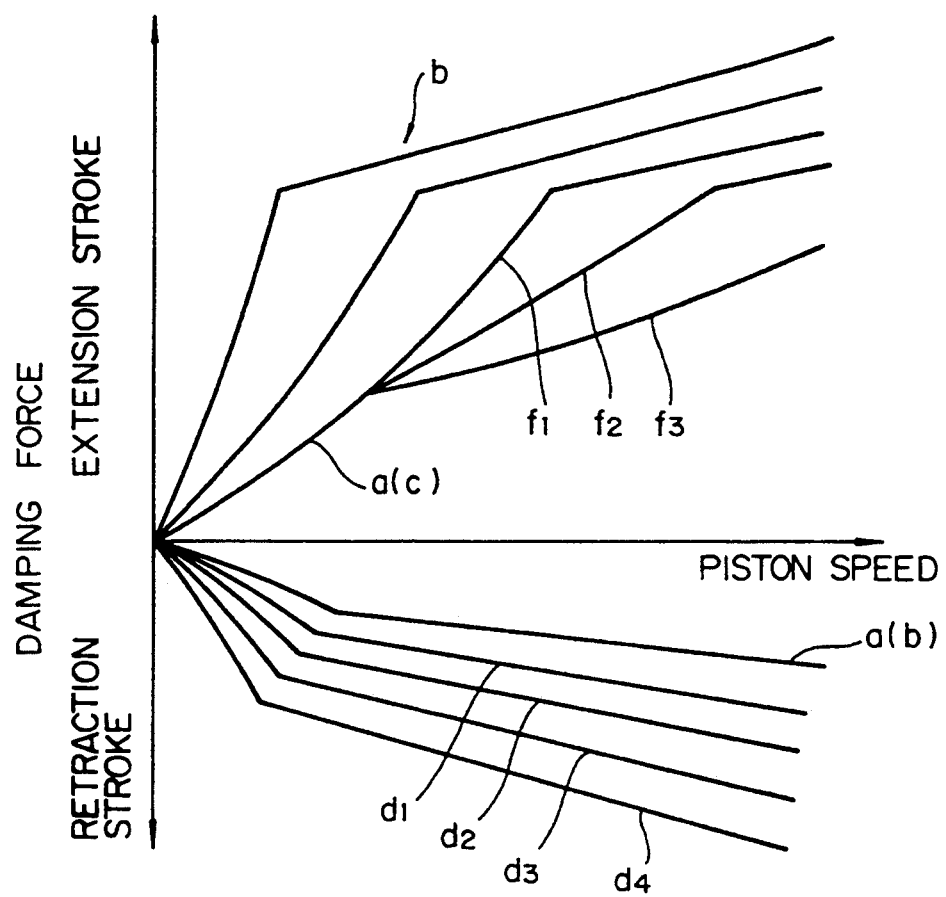
FIG. 20 is a graph of damping force characteristics of the hydraulic shock absorber, shown in FIG. 18, which arc obtained when the respective widths of the first upper, first lower, second upper and second lower slits in the shutter are changed.
Figure 21:
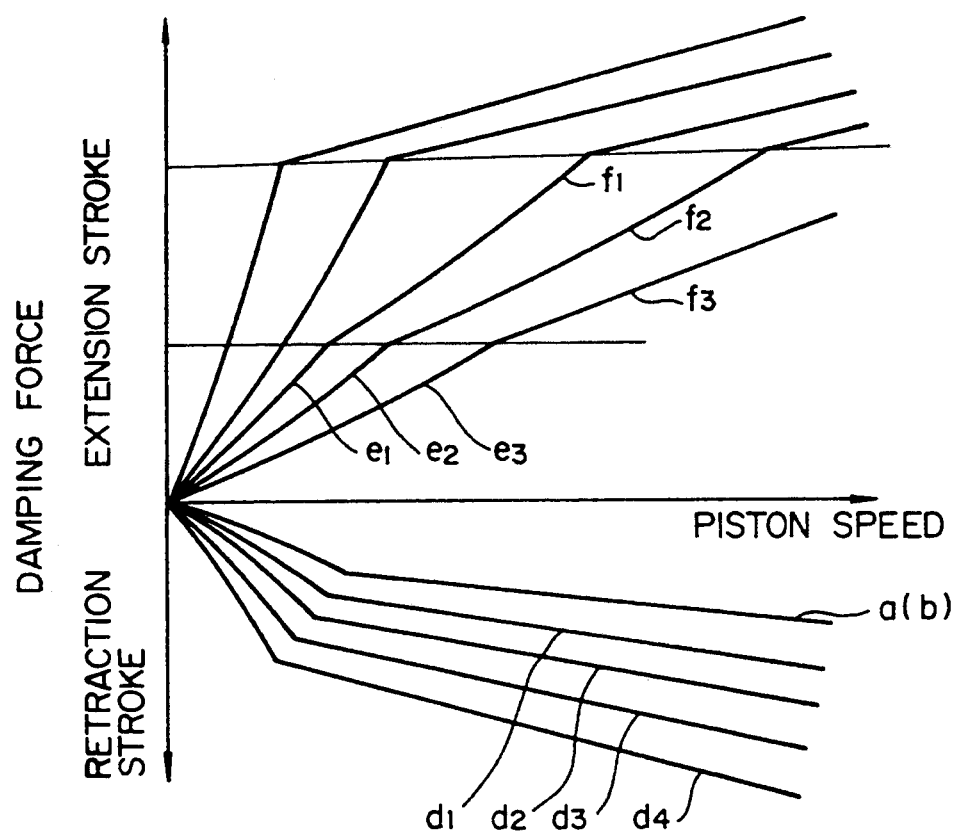
FIG. 21 is a graph of damping force characteristics of the hydraulic shock absorber, shown in FIG. 18, which are obtained when the respective widths of the first upper, first lower, second upper and second lower slits in the shutter are changed.

It should be noted that the areas of overlap between the first upper, second upper, first lower and second lower slits 83, 84, 85 and 86 and the respective bores 71, 71b, 72a and 72b are established based on the width of each slit and the degree to which the width of the triangular bore of each slit increases or decreases upon a given rotation of the shutter. With appropriate designs of the slits, a variety of damping force characteristics can be obtained. For example, various widths of the first upper and lower slits 83 and 85, establish the various damping force characteristics shown by the curves $d_1$, $d_2$... in FIGS. 20 and 21, in connection with the retraction stroke. With appropriate designs of the second upper slit 84 (various widths thereof), a variety of damping force characteristics, such as any of those shown by the curves $e_1$, $e_2$ and $e_3$ in FIG. 21, can be obtained in connection with the extension stroke at low piston speed. Further, with appropriate designs of the second upper and lower slits 84 and 86 (widths), various damping force characteristics, such as any of those shown by the curves $F_1$, $f_2$ and $f_3$ in FIGS. 20 and 21, can be established during the extension stroke at a relatively high piston speed.

As has been described above, the damping force control type of hydraulic shock absorber of the present invention enables various combinations of different damping force characteristics to be established during the extension and retraction strokes. Consequently, when the damping force control type of hydraulic shock absorber is used in combination with a suspension control system, before the direction of the stroke changes, the damping force characteristics in place can be switched to those which are desired for the next stroke. Therefore, the response lag of the controller is minimized, and an adequate control can be effected.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A damping force control hydraulic shock absorber comprising:
    a cylinder having a hydraulic fluid sealed therein;
    a piston slidably fitted in said cylinder to define two chambers in said cylinder;
    a piston rod having one end thereof connected to said piston and the other end thereof extending outside of said cylinder;
    a main hydraulic fluid passage placing said two chambers in communication with each other;
    a damping force generating mechanism, which dampens the flow of hydraulic fluid passing thereby, provided in said main hydraulic fluid passage;
    a bypass passage placing said two chambers in communication with each other and bypassing said damping force generating mechanism;
    a pair of first and second check valves provided in series in said bypass passage to allow hydraulic fluid to flow in respective directions which are different from each other through said bypass passage;

a guide member having a generally cylindrical side wall, opposite ends communicating with said bypass passage, and first and second bores extending through the side wall, said check valves covering said opposite ends of the guide member;

a first hydraulic fluid passage bypassing said first check valve, said first hydraulic fluid passage including said first bore and a space defined at the outer surface of said guide member and open to the first bore so as to be in communication with the interior of said guide member;

a second hydraulic fluid passage bypassing said second check valve, said second hydraulic fluid passage including said second bore and a space defined at the outer surface of said guide member and open to the second bore so as to be in communication with the interior of said guide member; and a shutter disposed within said guide member over said first and said second bores and movable relative to said guide member, said shutter having a configuration that changes the degree to which said bores are open to the interior of said guide member when said shutter is moved relative to said guide member to thereby vary the sectional area of said first and said second hydraulic fluid passages at locations therein defined between said shutter and said guide member, respectively.

2. A damping force control hydraulic shock absorber according to claim 1, and further comprising a damping force generating mechanism, which dampens the flow of hydraulic fluid passing thereby, provided in said bypass passage.

3. A damping force control hydraulic shock absorber according to claim 2, wherein said shutter comprises a plurality of shutter members, and has openings therethrough at the interface between adjacent ones of said shutter members of each pair thereof.

4. A damping force control hydraulic shock absorber according to claim 1 wherein said shutter comprises a plurality of shutter members, and has openings therethrough at the interface between adjacent ones of said shutter members of each pair thereof.

* * * * *